United States Patent
Belezko et al.

(10) Patent No.: US 12,417,212 B2
(45) Date of Patent: Sep. 16, 2025

(54) SYSTEMS AND METHODS FOR GENERATING GRAPH DATA STRUCTURE OBJECTS WITH HOMOMORPHISM

(71) Applicant: ROYAL BANK OF CANADA, Toronto (CA)

(72) Inventors: Kostya Belezko, Toronto (CA); Matthew Chang-Kit, Toronto (CA); Xiuzhan Guo, Toronto (CA); Ajinkya Kulkarni, Toronto (CA); Brechann McGoey, Toronto (CA); Iman Rezaeian, Toronto (CA); Guang Wang, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/099,068

(22) Filed: Nov. 16, 2020

(65) Prior Publication Data
US 2021/0149851 A1    May 20, 2021

Related U.S. Application Data

(60) Provisional application No. 62/935,416, filed on Nov. 14, 2019.

(51) Int. Cl.
*G06F 16/21* (2019.01)
*G06F 16/901* (2019.01)

(52) U.S. Cl.
CPC ........ *G06F 16/211* (2019.01); *G06F 16/9024* (2019.01)

(58) Field of Classification Search
CPC .................................................. G06F 16/211
See application file for complete search history.

(56) References Cited

U.S. PATENT DOCUMENTS

| | | | |
|---|---|---|---|
| 11,514,054 B1* | 11/2022 | Borthwick | G06N 20/00 |
| 2015/0006587 A1* | 1/2015 | Segaran | G06F 16/215 |
| | | | 707/798 |

(Continued)

OTHER PUBLICATIONS

Zhaoqi Chen, Dmitri V. Kalashnikov, and Sharad Mehrotra. 2007. Adaptive graphical approach to entity resolution. In Proceedings of the 7th ACM/IEEE-CS joint conference on Digital libraries (JCDL '07). Association for Computing Machinery, New York, NY, USA, 204-213. (Year: 2007).*

(Continued)

*Primary Examiner* — Brittany N Allen
(74) *Attorney, Agent, or Firm* — Norton Rose Fulbright Canada LLP

(57) ABSTRACT

A system for generating a storage-efficient data structure representing a plurality of inter-related data tables and adapted for use in data processing. The system configured to receive input data and generate a graph database having edges and vertices. Each inter-related data table of a plurality of inter-related data tables is received as input data and defines a corresponding vertex of the vertices. The edges defining pairwise relationships between the vertices based on one or more common elements of a corresponding pair of data tables. A reduced graph database is generated, as well as its connected-components. A partition defined by an equivalence relation on the graph database is used to generate the reduced graph database. Each set of the plurality of sets of the partition is represented by a single vertex of the corresponding set. An output data structure indicative of the connected-components, or additionally or alternatively, the irreducible generators, is generated.

17 Claims, 37 Drawing Sheets

(56) References Cited

U.S. PATENT DOCUMENTS

| | | | | |
|---|---|---|---|---|
| 2016/0012151 | A1* | 1/2016 | Muchinsky | G06F 16/23 |
| | | | | 707/748 |
| 2017/0076178 | A1* | 3/2017 | Cheng | G06K 9/6215 |
| 2017/0103165 | A1* | 4/2017 | Dunlevy | G06F 16/24575 |
| 2018/0114017 | A1* | 4/2018 | Leitner | G06F 21/554 |

OTHER PUBLICATIONS

Rabia Nuray-Turan, Dmitri V. Kalashnikov, and Sharad Mehrotra. 2013. Adaptive Connection Strength Models for Relationship-Based Entity Resolution. J. Data and Information Quality 4, 2, Article 8 (Mar. 2013), 22 pages. (Year: 2013).*

Tauer, G., Date, K., Nagi, R., & Sudit, M. (2019). An incremental graph-partitioning algorithm for entity resolution. Information Fusion, 46, 171-183. https://doi.org/10.1016/j.inffus.2018.06.001 (Year: 2019).*

Pfaltz, A Graph Similarity Relation Defined by Graph Transformation, 2018 International Conference on Applied Mathematics & Computational Science (ICAMCS.NET) (Year: 2018).*

* cited by examiner

1. Table1:

| Id | Email | Account | Address |
|---|---|---|---|
| 1 | a1@xmail.com | 101 | 1 Street, #10 |
| 2 | a2@xmail.com | 102 | 10 1 Str. |
| 3 | b1@xmail.com | 103 | 1 Ave. e, 200 |
| 4 | c1@xmail.com | 104 | 200 1 Avenue |
| 5 | d1@xmail.com | 105 | 200 1 Avenue E |

2. Table11:

| Id | account | Address | Email |
|---|---|---|---|
| 1 | 101 | 1 Street, #10 | a1@xmail.com |
| 2 | 102 | 10 1 Str. | a2@xmail.com |
| 3 | 103 | 1 Ave. e, 200 | b1@xmail.com |
| 4 | 104 | 200 1 Avenue | c1@xmail.com |
| 5 | 105 | 200 1 Avenue E | d1@xmail.com |

3. Table12:

| Id | account | Address | Email |
|---|---|---|---|
| 3 | 103 | 1 Ave. e, 200 | b1@xmail.com |
| 2 | 102 | 10 1 Str. | a2@xmail.com |
| 4 | 104 | 200 1 Avenue | c1@xmail.com |
| 1 | 101 | 1 Street, #10 | a1@xmail.com |
| 5 | 105 | 200 1 Avenue E | d1@xmail.com |

FIG. 7A

4. Table13

| Id | account | Address |
|---|---|---|
| 3 | 103 | 1 Ave. e, 200 |
| 2 | 102 | 10 1 Str. |
| 1 | 101 | 1 Street, #10 |
| 5 | 105 | 200 1 Avenue E |

5. Table2:

| Id | Phone | Account | Address |
|---|---|---|---|
| 1 | 123-4567 | 101 | 1 Street, #10 |
| 2 | 124-6567 | 102 | 10 1 Str. |
| 3 | 123-0567 | 103 | 1 Ave. e, 200 |
| 4 | 123-4569 | 104 | 200 1 Avenue |
| 5 | 999-9990 | 105 | 200 1 Avenue E |

6. Table21:

| Id | Phone | Account | Address |
|---|---|---|---|
| 2 | 1246567 | 102.00 | 10 1 Str. |
| 3 | 1230567 | 103.00 | 1 Ave. e, 200 |
|  |  |  |  |
| 1 | 1234567 | 101.00 | 1 Street, #10 |
| 4 | 1234569 | 104.00 | 200 1 Avenue |
| 5 | 9999990 | 105.00 | 200 1 Avenue E |
| 4 | 1234569 | 104.00 | 200 1 Avenue |

FIG. 7B

7. Table22:

| Id | account | Address | Phone |
|---|---|---|---|
| 2 | 102 | 10 1 Str. | 124-6567 |
| 4 | 104 | 200 1 Avenue | 123-4569 |
| 1 | 101 | 1 Street, #10 | 123-4567 |
| 3 | 103 | 1 Ave. e, 200 | 123-0567 |
| 5 | 105 | 200 1 Avenue E | 999-9990 |

8. Table1_2:

| Id | Phone | Account | Email | Address |
|---|---|---|---|---|
| 1 | 123-4567 | 101 | a1@xmail.com | 1 Street, #10 |
| 2 | 124-6567 | 102 | a2@xmail.com | 10 1 Str. |
| 3 | 123-0567 | 103 | b1@xmail.com | 1 Ave. e, 200 |
| 4 | 123-4569 | 104 | c1@xmail.com | 200 1 Avenue |
| 5 | 999-9990 | 105 | d1@xmail.com | 200 1 Avenue E |

9. Table1_2_1:

| Id | Phone | Email | Address |
|---|---|---|---|
| 2 | 124-6567 | a2@xmail.com | 10 1 Str. |
| 3 | 123-0567 | b1@xmail.com | 1 Ave. e, 200 |
| 5 | 999-9990 | d1@xmail.com | 200 1 Avenue E |

10. Table1_2_3:

| Id | Email | Address | Phone | account |
|---|---|---|---|---|
| 2 | a2@xmail.com | 10 1 Str. | 124-6567 | 102 |
| 4 | c1@xmail.com | 200 1 Avenue | 123-4569 | 104 |
| 5 | d1@xmail.com | 200 1 Avenue E | 999-9990 | 105 |
| 3 | b1@xmail.com | 1 Ave. e, 200 | 123-0567 | 103 |
| 1 | a1@xmail.com | 1 Street, #10 | 123-4567 | 101 |

FIG. 7C

11. Table3:

| Col1 | Col2 | Col3 | Col4 | Col5 |
|---|---|---|---|---|
| 1000 | Xy | 2000 | Edg | Add1 |
| 1001 | abc | 3000 | Email | Add2 |
| 1002 | Eq | 4000 | Qid | Add3 |
| 1001 | abc | 3000 | Email | Add2 |
| 1000 | Xy | 2000 | Edg | Add1 |

12. Table3_1:

| Col1 | Col2 | Col3 | Col4 | Col5 |
|---|---|---|---|---|
| 1000 | Xy | 2000 | Edg | Add1 |
| 1001 | abc | 3000 | Email | Add2 |
| 1002 | Eq | 4000 | Qid | Add3 |

13. Table3_2:

| Col1 | Col4 | Col2 | Col5 |
|---|---|---|---|
| 1002 | Qid | eq | Add3 |
| 1001 | Email | abc | Add2 |
| 1000 | Edg | xy | Add1 |

14. Table3_3:

| Col1 | Col4 | Col5 | Col2 |
|---|---|---|---|
| 1001 | Email | Add2 | Abc |
| 1002 | Qid | Add3 | Eq |
| 1000 | Edg | Add1 | Xy |

FIG. 7D

Table21':

| Id | Phone | Account | Address |
|---|---|---|---|
| 2 | 124-6567 | 102 | 10 1 Str. |
| 3 | 123-0567 | 103 | 1 Ave. e, 200 |
| 1 | 123-4567 | 101 | 1 Street, #10 |
| 4 | 123-4569 | 104 | 200 1 Avenue |
| 5 | 999-9990 | 105 | 200 1 Avenue E |

Table3':

| Col1 | Col2 | Col3 | Col4 | Col5 |
|---|---|---|---|---|
| 1000 | Xy | 2000 | Edg | Add1 |
| 1001 | abc | 3000 | Email | Add2 |
| 1002 | Eq | 4000 | Qid | Add3 |

FIG. 7E

| Table_1 | Table_2 | Is_Same_Row_Table_1 | Col_Table_1 | Row_Table_2 | Col_Table_2 | Num_Common_Row | Num_Common_Col |
|---|---|---|---|---|---|---|---|
| Table1 | Table11 | 1 | 5 | 4 | 4 | 5 | 4 |
| Table1 | Table12 | 1 | 5 | 4 | 4 | 5 | 4 |
| Table1 | Table13 | 0 | 5 | 4 | 3 | 4 | 3 |
| Table1 | Table2 | 0 | 5 | 4 | 4 | 5 | 3 |
| Table1 | Table21' | 0 | 5 | 4 | 4 | 5 | 3 |
| Table1 | Table22 | 0 | 5 | 4 | 4 | 5 | 3 |
| Table1 | Table1_2 | 0 | 5 | 4 | 5 | 5 | 4 |
| Table1 | Table1_2_1 | 0 | 5 | 4 | 3 | 3 | 2 |
| Table1 | Table1_2_3 | 0 | 5 | 4 | 3 | 5 | 4 |
| Table1 | Table3' | 0 | 5 | 4 | 3 | 0 | 0 |
| Table1 | Table3_1 | 0 | 5 | 4 | 3 | 0 | 0 |
| Table1 | Table3_2 | 0 | 5 | 4 | 3 | 0 | 0 |
| Table1 | Table3_3 | 0 | 5 | 4 | 5 | 5 | 4 |
| Table11 | Table12 | 1 | 5 | 4 | 4 | 4 | 3 |
| Table11 | Table13 | 0 | 5 | 4 | 5 | 5 | 3 |
| Table11 | Table2 | 0 | 5 | 4 | 4 | 5 | 3 |
| Table11 | Table21' | 0 | 5 | 4 | 4 | 5 | 3 |
| Table11 | Table22 | 0 | 5 | 4 | 4 | 5 | 4 |
| Table11 | Table1_2 | 0 | 5 | 4 | 5 | 3 | 2 |
| Table11 | Table1_2_1 | 0 | 5 | 4 | 4 | 5 | 4 |
| Table11 | Table1_2_3 | 0 | 5 | 4 | 5 | 0 | 0 |
| Table11 | Table3' | 0 | 5 | 4 | 3 | 0 | 0 |
| Table11 | Table3_1 | 0 | 5 | 4 | 3 | 0 | 0 |
| Table11 | Table3_2 | 0 | 5 | 4 | 3 | 0 | 0 |
| Table11 | Table3_3 | 0 | 5 | 4 | 3 | 0 | 0 |

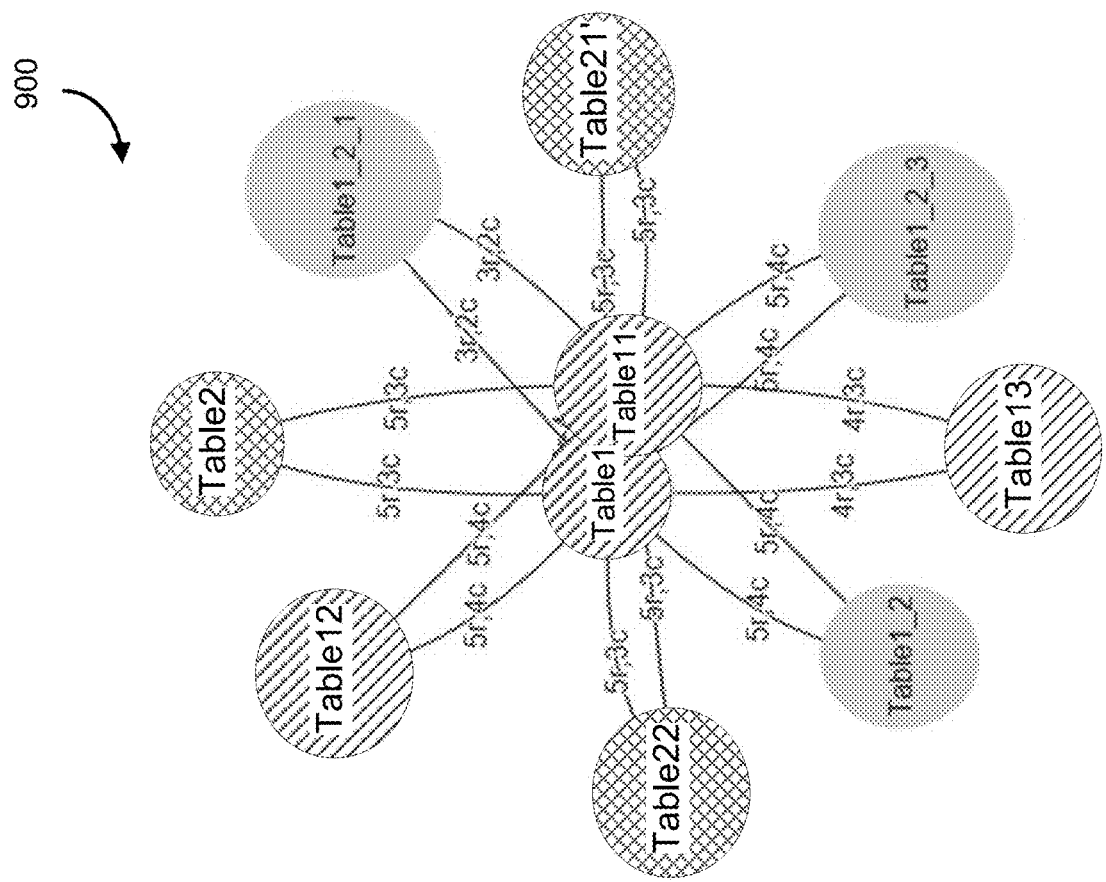
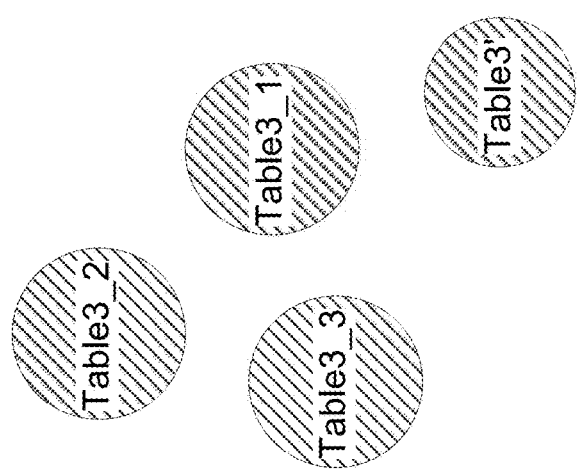
FIG. 9

{Table1, Table11, Table12, Table13}

{Table2, Table21', Table22}

{Table1_2, Table1_2_1, Table1_2_3}

{Table3', Table3_1, Table3_2, Table3_3}

FIG. 11

| Table_1 | Table_2 | Is_Same | Row_Table_1 | Col_Table_1 | Row_Table_2 | Col_Table_2 | Num_Common_Row | Num_Common_Col |
|---|---|---|---|---|---|---|---|---|
| Table1 | Table2 | 0 | 5 | 4 | 5 | 4 | 5 | 3 |
| Table1 | Table1_2 | 0 | 5 | 4 | 5 | 5 | 5 | 4 |
| Table1 | Table3 | 0 | 5 | 4 | 3 | 5 | 0 | 0 |
| Table2 | Table1_2 | 0 | 5 | 4 | 5 | 5 | 5 | 4 |
| Table2 | Table3 | 0 | 5 | 4 | 3 | 5 | 0 | 0 |
| Table1_2 | Table3 | 0 | 5 | 5 | 5 | 5 | 0 | 0 |

| Name | Address | Email | Phone Number |
|---|---|---|---|
| Jane Doe | #100, 123 Ave. | jdoe@xmail.com | |
| J. Doe | 100 -123 Avenue | jdoe@xmail.com | 123- 4567 |
| JDoe | | jr@ymail.com | 123 - 4567 |
| Joe Rose | 1000 Str., No.10 | | |
| Rose J | #10- 1000 Street | | 999 - 0000 |

2. t2:

| Name | Student ID | Score |
|---|---|---|
| Jane Doe | 00010001 | 214 |
| Joe Rose | 00010002 | 264 |
| Tim Timtim | 00010003 | 189 |

3. t3:

| Name | Address | Email | Phone Number | Student ID | Score |
|---|---|---|---|---|---|
| Jane Doe | #100, 123 Ave. | jdoe@xmail.com | | 00010001 | 214 |
| J. Doe | 100 -123 Avenue | jdoe@xmail.com | 123-4567 | 00010001 | 214 |
| JDoe | | jr@ymail.com | 123-4567 | 00010001 | 214 |
| Joe Rose | 1000 Str., No.10 | | | 00010002 | 264 |
| Rose J | #10- 1000 Street | | 999-0000 | 00010002 | 264 |

4. t4

| Phone Number | Student ID | Score |
|---|---|---|
| 123-4567 | 00010001 | 214 |
| 999-0000 | 00010002 | 264 |

5. t

| Phone Number (Last 4 digits) | Student ID (Last 3 digits) | Score |
|---|---|---|
| 4567 | 0001 | 214 |
| 0000 | 0002 | 264 |

FIG. 16A 6. d1:

| Id | Email | Account | Address |
|---|---|---|---|
| 1 | a1@xmail.com | 101 | 1 Street, #10 |
| 2 | a2@xmail.com | 102 | 10 1 Str. |
| 3 | b1@xmail.com | 103 | 1 Ave. e, 200 |
| 4 | c1@xmail.com | 104 | 200 1 Avenue |
| 5 | d1@xmail.com | 105 | 200 1 Avenue E |

7. d11:

| Id | account | Address | Email |
|---|---|---|---|
| 1 | 101 | 1 Street, #10 | a1@xmail.com |
| 2 | 102 | 10 1 Str. | a2@xmail.com |
| 3 | 103 | 1 Ave. e, 200 | b1@xmail.com |
| 4 | 104 | 200 1 Avenue | c1@xmail.com |
| 5 | 105 | 200 1 Avenue E | d1@xmail.com |

8. d12:

| Id | account | Address | Email |
|---|---|---|---|
| 3 | 103 | 1 Ave. e, 200 | b1@xmail.com |
| 2 | 102 | 10 1 Str. | a2@xmail.com |
| 4 | 104 | 200 1 Avenue | c1@xmail.com |
| 1 | 101 | 1 Street, #10 | a1@xmail.com |
| 5 | 105 | 200 1 Avenue E | d1@xmail.com |

9. d2:

| Id | Phone | Account | Address |
|---|---|---|---|
| 1 | 123-4567 | 101 | 1 Street, #10 |
| 2 | 124-6567 | 102 | 10 1 Str. |
| 3 | 123-0567 | 103 | 1 Ave. e, 200 |
| 4 | 123-4569 | 104 | 200 1 Avenue |
| 5 | 999-9990 | 105 | 200 1 Avenue E |

| Id | Phone | Account | Address |
|---|---|---|---|
| 2 | 1246567 | 102.00 | 10 1 Str. |
| 3 | 1230567 | 103.00 | 1 Ave. e, 200 |
|  |  |  |  |
| 1 | 1234567 | 101.00 | 1 Street, #10 |
| 4 | 1234569 | 104.00 | 200 1 Avenue |
| 5 | 9999990 | 105.00 | 200 1 Avenue E |
| 4 | 1234569 | 104.00 | 200 1 Avenue |

11. d102:

| Id | Phone | Account | Email | Address |
|---|---|---|---|---|
| 1 | 123-4567 | 101 | a1@xmail.com | 1 Street, #10 |
| 2 | 124-6567 | 102 | a2@xmail.com | 10 1 Str. |
| 3 | 123-0567 | 103 | b1@xmail.com | 1 Ave. e, 200 |
| 4 | 123-4569 | 104 | c1@xmail.com | 200 1 Avenue |
| 5 | 999-9990 | 105 | d1@xmail.com | 200 1 Avenue E |

12. d1021:

| Id | Phone | Email | Address |
|---|---|---|---|
| 2 | 124-6567 | a2@xmail.com | 10 1 Str. |
| 3 | 123-0567 | b1@xmail.com | 1 Ave. e, 200 |
| 5 | 999-9990 | d1@xmail.com | 200 1 Avenue E |

FIG. 16C d21:

| Id | Phone | Account | Address |
|---|---|---|---|
| 2 | 124-6567 | 102 | 10 - 1 Street |
| 3 | 123-0567 | 103 | 1 Avenue, 200 |
| 1 | 123-4567 | 101 | 10 - 1 Street, |
| 4 | 123-4569 | 104 | 200 1 Avenue |
| 5 | 999-9990 | 105 | 200 1 Avenue E |

FIG. 16D

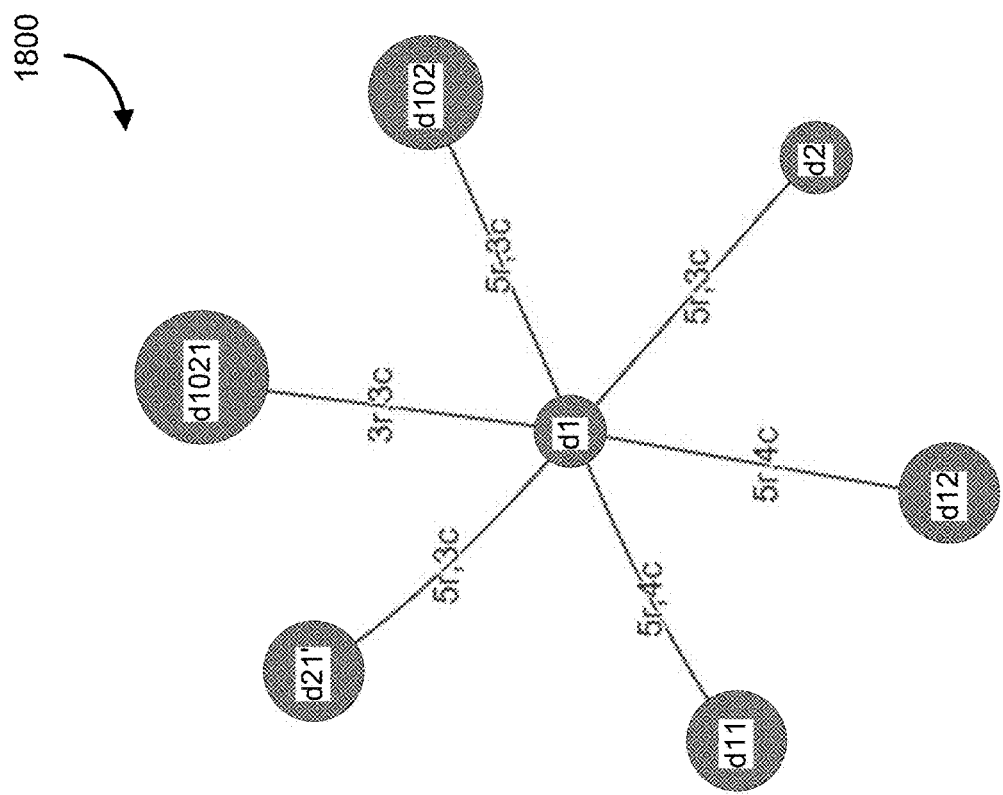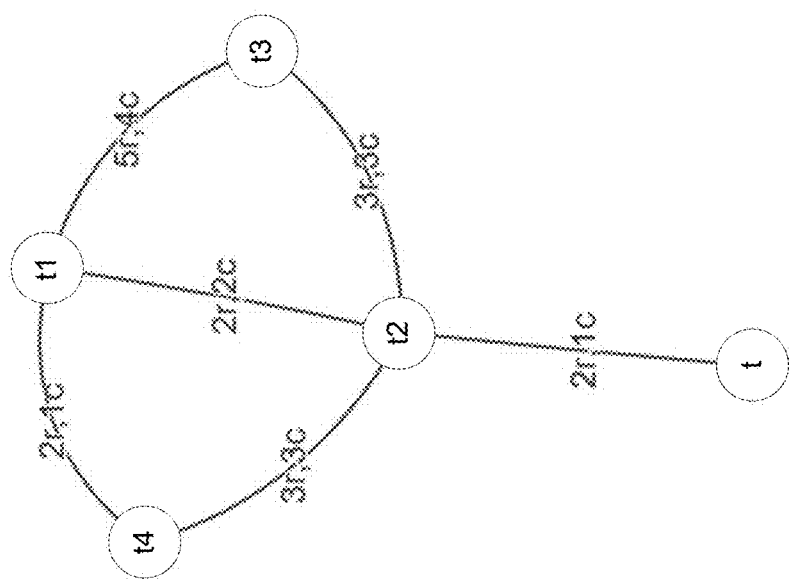
FIG. 18

| Table_1 | Table_2 | Is_Same | Row_Table_1 | Col_Table_1 | Row_Table_2 | Col_Table_2 | Num_Common_Row | Num_Common_Col | IsAdjacency |
|---|---|---|---|---|---|---|---|---|---|
| t1 | t2 | 0 | 5 | 4 | 3 | 3 | 2 | 2 | 1 |
| t1 | t3 | 0 | 5 | 4 | 2 | 6 | 5 | 4 | 1 |
| t1 | t4 | 0 | 5 | 4 | 2 | 3 | 2 | 1 | 1 |
| t1 | t | 0 | 5 | 4 | 5 | 4 | 0 | 0 | 0 |
| t1 | D1 | 0 | 5 | 4 | 5 | 4 | 0 | 0 | 0 |
| t1 | D2 | 0 | 5 | 4 | 3 | 5 | 0 | 0 | 0 |
| t1 | d102 | 0 | 5 | 4 | 5 | 4 | 0 | 0 | 0 |
| t1 | d1021 | 0 | 5 | 4 | 3 | 3 | 0 | 0 | 0 |
| t2 | t3 | 0 | 3 | 3 | 2 | 4 | 3 | 3 | 1 |
| t2 | t4 | 0 | 3 | 3 | 2 | 5 | 2 | 1 | 1 |
| t2 | t | 0 | 3 | 3 | 5 | 4 | 0 | 0 | 0 |
| t2 | D1 | 0 | 3 | 3 | 5 | 5 | 0 | 0 | 0 |
| t2 | D2 | 0 | 3 | 3 | 3 | 4 | 0 | 0 | 0 |
| t2 | d102 | 0 | 3 | 3 | 5 | 5 | 0 | 0 | 0 |
| D1 | D2 | 0 | 5 | 5 | 5 | 4 | 5 | 3 | 1 |
| D1 | d102 | 0 | 5 | 5 | 5 | 5 | 5 | 3 | 1 |
| D1 | d1021 | 0 | 5 | 5 | 3 | 4 | 3 | 3 | 1 |

$$2300 \searrow$$

$$\begin{bmatrix} 1 & 1 & 1 & 1 \\ 1 & 1 & 0 & 0 \\ 1 & 0 & 1 & 0 \\ 1 & 0 & 0 & 1 \end{bmatrix}$$

FIG. 23

SYSTEMS AND METHODS FOR GENERATING GRAPH DATA STRUCTURE OBJECTS WITH HOMOMORPHISM

CROSS-REFERENCE

This application is a non-provisional of, and claims all benefit, including priority to, U.S. Application No. 62/935,416, entitled SYSTEMS AND METHODS FOR GENERATING GRAPH DATA STRUCTURE OBJECTS WITH HOMOMORPHISM, filed Nov. 14, 2019, incorporated herein by reference in its entirety.

FIELD

The present disclosure relates to the field of graph data structures, and more specifically, transformations of graph databases to reduce redundancy and increase ease of downstream computations using homomorphism.

BACKGROUND

Data sets can be large, noisy, and connected. Organizations use graph database data structures to store and process relationship information, for example, to support semantic queries of the graph database data structures with nodes, edges and their properties. However, there are many possible approaches for generating graph data structures, and differing technical approaches yield different technical benefits.

The size of data sets is becoming ever larger. Data sets are typically stored in databases (or data tables) that provide structured access. Data is commonly stored in relational databases (e.g., SQL implementations) or in graph databases (e.g., neo4j implementations). The latter are often preferred for running complex queries since they allow efficient traversal of relationships between data components.

Operations can be carried out on databases, e.g., simple operations on relational databases include PROJECT, JOIN, PRODUCT, UNION, INTERSECT, DIFFERENCE, and DIVIDE. Such and other operations are used to generate new (downstream or child) databases from existing databases or databases to meet the needs of an organization, e.g., client information databases.

SUMMARY

A plethora of databases may be spawned from a smaller set of parent databases, and this becomes a major contributor to technical challenges associated with ease of computation of the data. Accordingly, over time, tracking the provenance of information in databases becomes unwieldy or impossible. Redundant data proliferates in an organization, as parent database information is combined, transformed in various ways.

The ability to conduct computational operations on the databases becomes constrained as the operations are faced with computing through volumes of redundant data that are effectively spawned from the same parent data. Accordingly, metadata and manual audit reports may be needed to keep track of database lineage. In absence of such meticulous information, the origin of data in database may be unknown and thus the veracity, reliability, timestamping or other aspects of the data may be called into question. This may impose significant limitations, or alternatively impose significant overhead in maintaining databases.

In many cases, multiple databases may exist and may together contain information regarding the same physical entity. For example, one database may record client addresses and phone numbers while another database may record client inquiries. Entity resolution is needed to associate together information about the same physical entity that may be spread across multiple data tables. For example, a financial institution may wish to survey clients that recently submitted inquiries and thus would need to resolve entities in multiple databases. In some cases, entity resolution can be a computationally intensive and error prone process. As another example, textual information or data may be recorded in a graph database. Entity resolution may be needed to identify common or similar sentences in documents.

As described in various embodiments herein, an improved computer system that is configured to automatically generate transformed storage-efficient data structures from a plurality of input inter-related data tables that may have redundant information stored between them. The storage-efficient data structures can then be used for various simplified computational tasks, such as automatically identifying a specific database schema or establishing a data lineage. As the storage-efficient data structures have less redundancy, computational tasks on the tables can be performed against them with a performance improvement relative to performance on the original plurality of input inter-related data tables.

It is important to note that the similarity determination to establish commonalities between aspects of the tables introduce errors, and in some embodiments, performance testing is conducted to validate that the output data structure is useful for its intended purpose. If validation fails, the process can be run again having certain characteristics (e.g., selecting a different representative table among a set of redundant tables) perturbed such that a variant output can be generated, which can then undergo the validation process again.

Corresponding methods, and non-transitory computer readable media are contemplated.

The system comprises one or more processors operating in conjunction with computer memory, the one or more processors configured to carry out steps or execute a method. In some embodiments, a non-transitory computer readable medium storing machine interpretable instructions is disclosed. When such instructions are executed by a processor, a method is or steps are executed.

Input data is received that is indicative of the plurality of inter-related data tables. In some embodiments, the input data is received from a plurality of network-based non-transitory storage devices having the plurality of inter-related data tables stored thereon. Thereafter a graph database is generated using the inter-related data tables. The graph database comprises vertices and edges. Each inter-related data table of the plurality of inter-related data tables defines a corresponding vertex of the vertices. The edges define pairwise relationships between the vertices, i.e., each edge connects one vertex to another and represents a relationship between the data tables that are represented by the vertex. Each of the pairwise relationships is defined by one or more common elements of a corresponding pair of data tables of the plurality of inter-related data tables. For example, a relationship is established when two data tables have a common row, common column, or both.

The graph database is then used to generate a reduced graph database by removing one or more of the vertices of the graph database based on a partition of the graph database. The reduced graph database may be a quotient graph of the graph database. The partition of the graph comprises a plurality of sets that together cover the graph database (or vertices), e.g., disjoint sets whose union is equal to the graph database (or vertices). For example, if there are N vertices, a partition would comprise M sets, where M is less than or equal to N. The reduced graph database then also contains M vertices only, i.e., each set of the plurality of sets of the partition is represented in the reduced graph database by a single vertex of the corresponding set with associated one or more edges. The partition of the graph database is defined by an equivalence relation on the graph database, i.e., the sets of the partition are the equivalence classes under the equivalence relation.

Once a reduced graph database is obtained, connected-components of reduced graph database are generated. In graph theory, a component or a connected-component of an undirected graph is a subgraph in which any two vertices are connected to each other by paths. The connected-component of a graph may be computed in linear time using either breadth-first search or depth-first search. For example, a search may begin at a particular vertex v and will find an entire component containing v (and no more) before returning. All the components (or connected-components) of a graph are then found by looping through its vertices, starting a new breadth first or depth first search whenever the loop reaches a vertex that has not already been included in a previously found component.

In some embodiments, an output data structure indicative of the connected-components is then generated. In some embodiments, an additional output data structure indicative of the graph database is generated, e.g., it may be at least partially indicative of an adjacency matrix.

In some embodiments subsets forming the connected-components of the reduced graph database are processed to determine sets of irreducible generators. Each set of irreducible generators is configured to generate a corresponding connected-component of the reduced graph database and has no proper subset capable of generating the corresponding connected-component. For example, each connected-component may be examined for whether it forms an irreducible (generator) set or not. If any subset can be removed without affecting the irreducible character of the set, it may be deemed a redundant vertex and thus removed. This process continues until only the irreducible set is left.

In some embodiments then, the generating output data is indicative of the sets of irreducible generators and is adapted to probe data lineage of the plurality of inter-related data tables.

In some embodiments, the output data structure is adapted to be queried for entity-specific information for each of a plurality of separate entities because the graph transformation is a homomorphism, and thus the query may also be thus transformed. Each data table of the plurality of inter-related data tables includes entity-based information for the plurality of separate entities.

As an example, each data table of the plurality of inter-related data tables may include textual data, and the output data structure may be adapted to distinguish textual data based on Bag of Words and word ordering.

In some embodiments, k-core graph data structure objects are generated by transforming the connected-components of the reduced graph database and the output data is indicative of the k-core graph data structure objects.

In some embodiments, the output data structure is transmitted to a terminal, via a network.

As described herein in various embodiments, graph data objects are considered data structures and specific approaches are contemplated based on the relationships and transformations between the objects. A class of graph structure objects are collected together with their structure-preserving maps.

Example operations and transformations for graph object data structures are also described, including non-limiting example applications of the operations and transformations to example class of problems in entity resolution, natural language processing, data table relationships, and database schema search. Other problems and variations are possible.

In accordance with a first aspect, there is provided a system for establishing one of more graph data structure objects adapted for use in data processing. The system includes a data receiver configured to receive a first graph data structure object and a second graph data structure object, and a processor. The processor is configured to define an equivalence relation based at least on a comparison of the first graph data structure object and the second graph data structure object; and generate one or more graph homomorphism data structure objects based on the equivalence relation.

In accordance with another aspect, the processor is further configured to: transform the one or more graph homomorphism data structure objects establish a k-core graph data structure object that is a maximal connected subgraph of the one or more graph homomorphism data structure objects formed by repeatedly deleting all vertices of degree at least k.

In accordance with another aspect, the processor is further configured to: conduct k-core decomposition of the one or more graph homomorphism data structure objects to obtain a set of k-core graph data structure objects that each are a maximal connected subgraph of the one or more graph homomorphism data structure objects formed by repeatedly deleting all vertices of degree at least k, the set including k-core graph data structure objects from the one or more graph homomorphism data structure objects to a main core graph data structure object, the set indicative of a hierarchy of levels of increasing cohesiveness.

In accordance with another aspect, processor is further configured to determine one or more irreducible generator data objects from the set of k-core graph data structure objects.

In accordance with another aspect, processor is further configured to generate an output data structure including at least the one or more irreducible generator data objects.

In accordance with another aspect, processor is further configured to generate an output data structure including at least the one or more irreducible generator data objects.

In accordance with another aspect, the one or more graph homomorphism data structure objects are generated based on binary relations between the first graph data structure object and the second graph data structure object.

In accordance with another aspect, the equivalence relation is selected from a set of equivalence relations such that a smallest equivalence relation is selected.

In accordance with another aspect, the equivalence relation is selected from a set of equivalence relations such that a largest equivalence relation is selected.

In accordance with another aspect, at least one of the first graph data structure object and the second graph data structure object are quotient graphs determined from one or more underlying graph data structure objects.

The system is adapted to implement the corresponding method for generating or applying graph data structure objects as described in various embodiments, and the method, in some embodiments, is encapsulated in the form of a non-transitory computer readable media storing machine-interpretable instructions which when executed, cause a processor to perform the method stored thereon.

The system can be, in some embodiments, a special purpose machine, such as a server or a rack mounted appliance that resides within or electrically coupled to a data center that includes a message bus upon which the special purpose machine receives data sets (e.g., from computer servers or data storage associated with different data sources). In this example, the system is configured to receive the input data sets from the message bus and generate reduced graph data objects as outputs to the message bus.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 7A, FIG. 7B, FIG. 7C, FIG. 7D, and FIG. 7E are a set of tables shown to illustrate the workflow of FIG. 6, according to some embodiments.

FIG. 8 is a table showing a subset of table comparison results, according to some embodiments.

FIG. 9 is a graph representation of relationships of FIG. 8, according to some embodiments.

FIG. 10 shows a portion of the 14×14 adjacency matrix, according to some embodiments.

FIG. 11 is an example common row and column relationship graph, according to some embodiments.

FIG. 12 is a common row and column relationship graph provided, according to some embodiments.

FIG. 16A, FIG. 16B, FIGS. 16C, and 16D are a set of tables shown to illustrate workflow of FIG. 6, according to some embodiments.

FIG. 18 is a graph representation of relationships of FIG. 17, according to some embodiments.

FIG. 19 shows a 7×7 adjacency matrix, according to some embodiments.

FIG. 20 is an example common row and column relationship graph, according to some embodiments.

FIG. 23 is an example adjacency matrix of FIG. 22, according so some embodiments.

DETAILED DESCRIPTION

Figure 1:
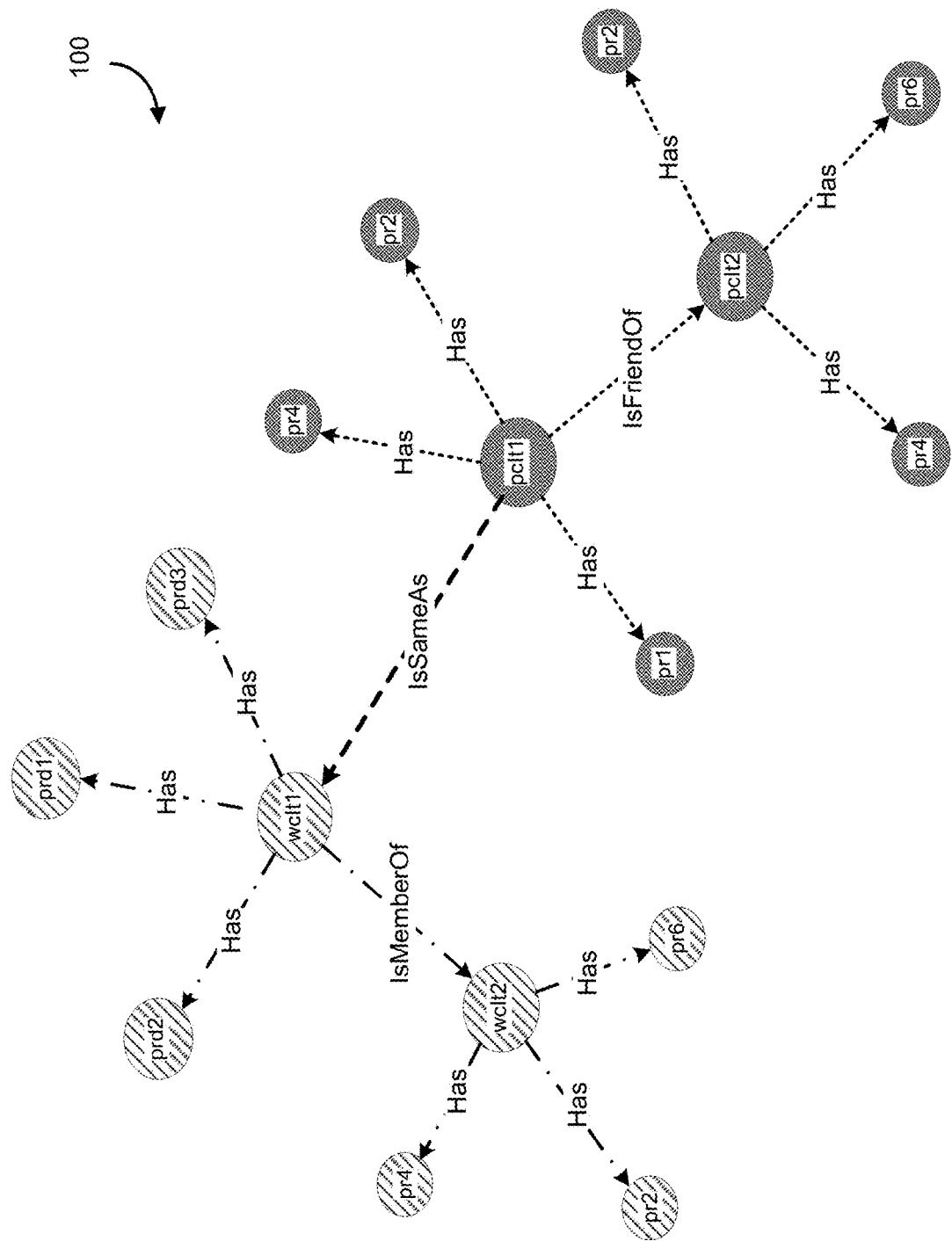
FIG. 1 is an example product graph, showing relationships between different nodes, according to some embodiments.

Data sets, synthesized from multiple sources with various formats, are not only big but also noisy and connected. To mine insights from complex data, the connectedness and integrate data sets can be modelled together. Graphs, mathematical structures used to model pairwise relations between objects, can provide a suitable environment for modeling data connectedness. "Big data" is prevalent in many organization. Data sets, from multiple sources and with various formats, are not only big but also noisy and connected. To move from data collecting to data connecting and mine insights from them, it is necessary to model the connectedness between them and integrate them together, e.g. to achieve entity resolution or track data lineages.

As an example, a financial institution may have hundreds or thousands of data bases or data tables, i.e. with rows and columns as in a relational database. These data tables may be derived from one another and from a smaller subset of parent databases at a point-in-time. For example, the number and size of data tables may have grown significantly over a period of 10-15 years. Without detailed hierarchical relationships mapped out, e.g. in the metadata, it may be near impossible to determine where the information in a database has come from (the parent data).

Thus, it may not be possible to use the data base because of lack of reliability and inability to verify data provenance. The financial institution may thereby be limited in the services it offers to clients or otherwise may need to seek out the same data anew in a rigorously audited process. With data surviving longer and longer lifecycles, the lack of predictability vis-à-vis future use of data, and the large amount of resources needed to manage data throughout its lifecycle, such situations are likely to become only more common.

In some embodiments disclosed herein, data tables from a technological ecosystem (e.g. of a financial institution's system) are ingested into a system that then generates an output data structure indicative of a smaller set of tables that are "parent" data tables of the ingested data tables. In some embodiments, the output data structure is indicative of irreducible generators of the ingested data tables, i.e. no proper subset of the data tables used in the output data structure is able to completely generate the ingested data tables. Such generators remove redundancy in the representation and reveal the "roots" of the data which is important for managing risk associated with the data.

As yet another example, having client information distributed over a multitude of data tables may make it very difficult to consolidate client-specific information. For example one data table may include a client's phone number while another data table may include a client's email address and there may be no explicit link between the data tables. In such a scenario, a brute-force approach would be needed, e.g. all the tables would have to be searched and examined separately to connect the email address and the phone number. There may be no coherent way of searching through the databases to retrieve client-specific data. In some embodiments disclosed herein, relationships between ingested data tables are established via graph databases whose nodes (vertices) are data tables, in order to facilitate entity resolution.

A graph database uses graph structures for semantic queries with nodes, edges, and properties to represent and store data. Graph databases can query nodes, their labels, and their properties while SQLs, on the other hand, query tables, rows, and columns. However, entity relationships in entity resolution areas, text structures in natural language processing, and data table relations in a relational database can be modeled as graphs or networks and the problems related to graph theory in entity resolution, database relationship, and natural language processing, are solved in different environments separately and might be difficult to solve due to their complexities and computing issues.

In these cases, a system for mapping the original problems to other environments so that they can be solved more effectively can be provided. To change problem framing, the system could advantageously transform the original graph structures and query statements to other formats so that complexity and difficulty of a problem can be reduced. Certain classes of problems in such as entity resolution, text graphs in natural language processing, data table relationships, and database schema search, etc., share certain properties.

The objective of some embodiments described herein is to introduce a framework of comparing and transforming graph database objects and their query systems and apply the mechanism to the problems in entity resolution, data table relationships, database schema search, and natural language processing, using the unified way formatted by graph object transformations and operations.

Problems related graph theory in entity resolution, database table relationships, and natural language processing have computing issues so that their predictive accuracies are insufficient and their computations might not be limited in many cases.

A decrease in computational complexity can be established through the transformations described herein, which in turn allows certain technical problems relating to computational analysis to be overcome or solved using less computational resources. As described herein in various embodiments, graph data objects are considered data structures and specific approaches are contemplated based on the relationships and transformations between the objects.

A class of graph structure objects are collected together with their structures-preserving maps. Connectedness in big data can be modeled by graph objects. As graph homomorphisms preserve graph database structures (structure-preserving maps), the approach of some embodiments uses graph homomorphisms to compare graph database objects. Since graph database objects can be considered as presheaves, operations, such as, limits and colimits in graph databases (limits and colimits offer ways to construct new objects), can be determined by the same ways as in sets. Limits, colimits, relations and equivalence relations on vertices, and quotient graphs can then be used to generate the graph homomorphisms and the transformations for graph databases.

Therefore, graph transformations convert the problems in entity resolution, database relations, and natural language processing from the original environments into the new environments in which the problems can be solved with high accuracies more easily by a unified method. A practical embodiment of a solution is proposed in some embodiments to address a technical problem, and the graph transformations can be practically implemented in relation to real-world data sets stored thereon showing relationships between, for example, customer data sets, infrastructure monitoring data sets, among others.

As noted in variant embodiments herein, example operations and transformations for graph object data structures are also described, including non-limiting example applications of the operations and transformations to example class of problems in entity resolution, natural language processing, data table relationships, and database schema search. Other problems and variations are possible.

In various embodiments, a system may include a data receiver configured to receive a first graph data structure object (e.g., data sets representing customer data for a first banking product and relationships between customers) and a second graph data structure object from a data storage (e.g., data sets representing a graph representing customer data for a second banking product and relationships between customers), which can be coupled to data sources. In some embodiments, the graph data structure object may be rendered in the form of relational data bases, and data tables.

The data sets can be provided in the form of graph data objects, or, in some embodiments, as relational database entries or flat files. Indications of relationships can include pointers, data values in corresponding columns or rows, metadata, among others.

A relation generation engine is configured to define an equivalence relation, e.g., based at least on a comparison of the first graph data structure object and the second graph data structure object. The equivalence relation is a mapping between one or more portions of the first graph data structure object and the second graph data structure object, and the relation generation engine then uses the equivalence relation to generate one or more graph homomorphism data structure objects.

In some embodiments, after obtaining connected-components a k-core graph data structure object that is a maximal connected subgraph of the one or more graph homomorphism data structure objects formed by repeatedly deleting all vertices of degree at least k. In some embodiments, a data output may be configured to encapsulate a data structure storing either the one or more graph homomorphism data structure objects or the k-core graph data structure object that can be provided as an improved graph data object for use by a downstream processing engine.

Graphs and Graph Examples

A graph G consists of a pair G=(V(G),E(G)) (or G=(V,E) or even only G if the context is obvious) where V(G) is a finite set of vertices and E(G) is a set of unordered pairs of distinct elements in V(G) whose members are called edges. The graphs as defined above are called simple graphs.

A simple graph can be specified by both a finite set E of nodes and a finite set E of edges with the domain and the codomain of each edge being defined. Hence a simple graph can be viewed as a relation E⊆V×V. Conversely, each relation on a finite set T: R⊆T×T gives rise to a simple graph with T as its vertices and R as its edges. A simple graph is symmetric, or reflexive, or irreflexive, etc., if the relation E is symmetric, or reflexive, or irreflexive, etc., respectively.

Given a graph G, if uv∈E(G), one can indicate that u and v are adjacent and u is an inneighbor of v and v is an outneighbor of u. In any case, u and v are adjacent in a digraph as long as at least one of uv, vu is an arc; in that case u and v are neighbors. The number of neighbors of v (other than v) is the degree of v; the number of inneighbors (outneighbors) of v is the indegree (outdegree) of v.

G is a subgraph of H, and H a super graph of G, if V(G)⊆V(H) and E(G)⊆E(H). Also, G is an induced subgraph of H if it is a subgraph of H and contains all the arcs (edges) of H amongst the vertices in G.

Product Graph

An organization can have multiple systems for example labelled, such as, P&CB (personal and commercial banking), investor and treasury services (ITS), and wealth management (WM), among others. Each has its own clients, accounts, and products. To recommend Financial Institution products effectively, a system needs to be able to traverse the relationships between clients from different systems and among Financial Institution products.

FIG. 1 is an example product graph, showing relationships between different nodes, according to some embodiments. The graph 100 shown is an example, and it describes the relationships between two Financial Institution Personal and Consumer Banking (P&CB) clients and two Financial Institution Wealth Management (WM) clients. Using graph database computing approaches, the system can be utilized to automatically generate predictions or estimations for recommending Financial Institution products to Financial Institution existing clients and target potential clients and customers.

As described herein, due to proliferation of database tables over time, there may be a large amount of redundancy that has been generated as various operations are used to combine, split, transform original data, and generating a reduced graph database structure is useful in this situation to reduce a computational burden when conducting automated analyses that interact (e.g., traverse) the data tables.

In some situations, the reduced graph database or derivative information thereof can be utilized as a processing replacement for the database tables. However, in further embodiments, there may be a step of validating the reduced graph database or derivative information thereof to ensure that there is acceptable accuracy or performance gains (in case it introduces errors or isn't actually that helpful), and re-generating a perturbed version of the reduced graph database as required (to be re-validated again). In this example, only after successful validation is the reduced graph database or derivative information used as a stand-in transformed data structure for the data processing operations.

Text Graph

Text data is prevalent: from marketing and advertising, social media, to document database, etc. As text is unstructured, to conduct text mining, documents are converted in representations, such as, bags of words where a text (such as a sentence or a document) is represented as the bag (multiset) of its words, disregarding grammar and even word order. Representations by bags of words have limitations.

Figure 2:
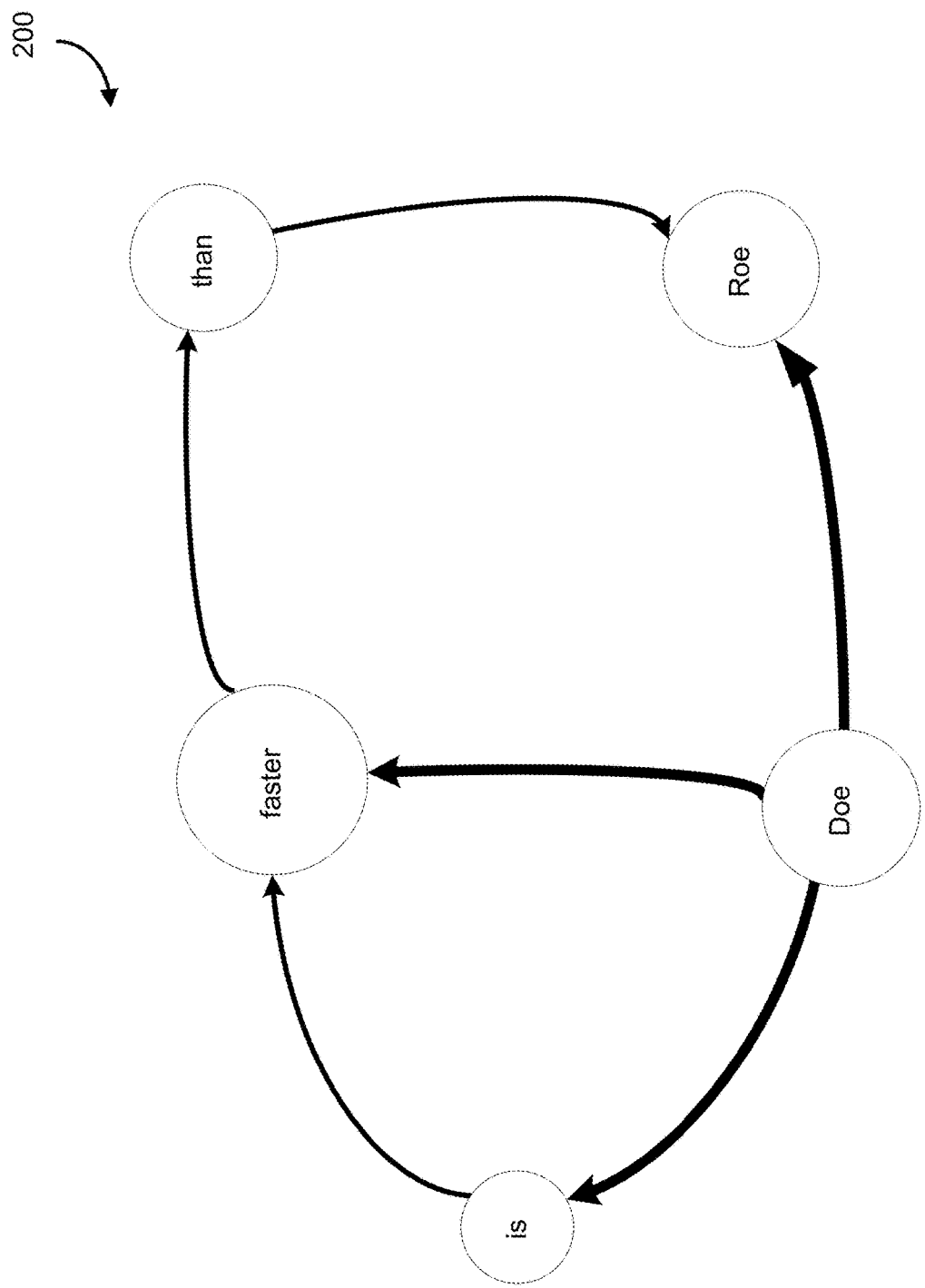
FIG. 2 is an example graph model, according to some embodiments.

For example, term independence assumption and term frequency weighting. Graph-based document representations can take into account word dependence, order and distance. For instance, both "Doe is faster than Roe" and "Roe is faster than Doe" are the same within bag of words. But term orders can be captured by graph model 200 shown in FIG. 2. FIG. 2 is an example graph model, according to some embodiments (e.g., a simple graph of words example).

Graph data structures or objects can be represented by adjacency matrices, adjacency lists, incidence matrices, incidence lists, or may be rendered as data tables.

Given a graph G=(V,E), the adjacency matrix A of G is a n×n matrix such that $A_{ij}=1$ if there is an edge from vertex $V_i$ to vertex $V_j$ and 0 if there is no edge from vertex $V_i$ to vertex $V_j$.

The adjacency list data structure of a graph G=(V,E) is a list of the neighbors of a given vertex: list[i] represents the list of vertices adjacent to the ith vertex in G.

The incidence matrix or list for a graph, on the other hand, indicates whether vertex-edge pairs are incident or not. The incidence matrix of a graph G=(V,E) is a m×n matrix B, where m and n are the numbers of vertices and edges of G respectively, such that $B_{ij}=1$ if the vertex $V_i$ and edge $E_j$ are incident and 0 otherwise. The incidence list of a graph G=(V,E) gives a list of edges incident to a vertex.

The choice of these graph representations depends on the type of graph operations to be performed and how graph structures are transformed.

Definitions

Each simple graph is equivalent to a relation.

As a simple graph can be specified by a finite set of edges and domain and codomain for each edge, which can be considered as a functor from a small category with two dots and two arrows to Sets. The first dot is used to choose edges and the second one for vertices which one arrow is to specify domain and another one codomain. Homomorphism between two graphs is then the natural transformations between functors.

Categorically, the category Graph of all simple graphs is $Set^2$, where 2=•→•

Graph=$Set^2$, where 2 is the simple graph with 2 vertices and two parallel edges.

A graph homomorphism f from a graph G=(V(G),E(G)) to a graph H=(V(H),E(H)), denoted by f:G→H is a function from V(G) to V(H) such that (u,v)∈E(G) implies (f(u),f(v))∈E(H) for all pairs of vertices u,v in V(G).

A graph homomorphism between two graphs is a graph structure-preserving function.

All graph homomorphisms preserve adjacency and generalize colorings.

Quotient graphs of G are equivalent to homomorphic images of G.

If f:G→H is a graph homomorphism and S is a subgraph of G, then: f(G)=F(V(G)),f(E(G))) is a subgraph of H.

If Q is a query on G then Q can be mapped to a query on H, denoted by f(Q).

A complete graph is a graph in which each pair of graph vertices is connected by an edge. A complete graph with n nodes is noted by $K_n$.

A n-coloring of a graph G is an assignment of n colors to the vertices of G, in which adjacent vertices have different colors.

Homomorphisms $f:G \to K_n$ are precisely the n-colorings of G.

A graph is a core if and only if it is not homomorphic to a proper subgraph.

A graph G is a core if every homomorphism $f:G \to G$ is an isomorphism.

Any complete graph is a core.

If a graph H is a core of G then H is a core.

Every graph has a core.

The core of a graph is unique up to isomorphism.

A graph is a core if and only if it has no proper retracts.

A k-core of a graph is a maximal connected subgraph of the graph such that all vertices have degree at least k. It is one of the connected components of the subgraph of the graph formed by repeatedly deleting all vertices of degree at least k. k-core decomposition of a graph is the list of all its cores from 0 (the graph itself) to its main core. It shows the hierarchy of levels of increasing cohesiveness.

Binary Relation and Equivalence Relation

Given a non-empty set X, a binary relation R on X is a subset $R \subseteq X \times X$. A binary relation R on X can be viewed as a subset of $X \times X$, a bipartite graph, an incidence matrix, or a directed graph. Given two binary relations R,S on X, some operations on binary relations can include the following:

Complement: $R^c = X \times X \setminus R$;

Intersection: $R \cap S$;

Union: $R \cup S$;

Inverse: $R^{-1} = \{(y,x) | \forall (x,y) \in R\}$;

Composition: $RS = \{(x,z) | \exists y \text{ such that } (x,y) \in R \text{ and } (y,z) \in S\}$;

Equivalence relations and partitions on a given set are equivalent. Given a set S, a subset $R \subseteq S \times S$ is called a relation on S. R is an equivalence relation if and only if it is reflexive, symmetric and transitive:

For all $s \in S$, $(s,s) \in R$;

$(s,t) \in R \Rightarrow (t,s) \in R;$ $(s,t),(t,u) \in R \Rightarrow (s,u) \in R.$ The equivalence class [s] of s under R is defined to be $[s] = \{x \in S | (s,x) \in R\}$. All equivalence classes S/R under R form a partition of S.

Let $\Re(S)$ and $\mathfrak{P}(S)$ denote the all equivalence relations and all partitions on S, respectively. There is an isomorphism I between all equivalence relations $\Re(S)$ and $\mathfrak{P}(S)$ given by $R \mapsto S/R$. $\mathfrak{P}(S)$ is a partially ordered set (poset) with the refinement order: $R \leq R'$ if and only if each equivalence class of R is contained in an equivalence class of R' and so it is a lattice with the two trivial partitions of S as its minima and maximal elements. By the isomorphism I, $\Re R(S)$ is also a lattice with the join and meet given by those in $(5)$:

$R \lor R' = I^{-1}(I(R) \lor I(R')).$ $R \land R' = I^{-1}(I(R) \land I(R')).$

More specifically, $R \lor R' = R \cup RR' \cup RR'R \cup \ldots \cup R'R'R'R'R \cup \ldots,$ $R \land R' = R \cap R'.$ They are the smallest equivalence relation containing both R and R' and the largest equivalence relation contained in both R and R'.

Quotient Graph

Let $G = (V,E)$ be a graph. Let $\sim$ be an equivalence relation on V. The quotient graph of V with respect to $\sim$, denoted by $G/\sim$, is a graph whose vertex set is the quotient set $V/\sim$ and edge set [E] defined as follows: two equivalence classes [u], [v] form an edge iff uv forms an edge in G.

Quotient of Financial Institution Product Graph

Revisiting Financial Institution product graph described above (FIG. 1). After

Financial Institution client matching, the system finds that P&CB client pclt1 and Wealth management client wclt1 are the same. Then the system defines the equivalence relation on the nodes of the Financial Institution product graph as follows:

pclt1~wclt1 and all other nodes are self-related. Quotients of all nodes in Financial Institution product graph (FIG. 1) by the equivalence relation ~ mean identifying only pclt1 and wclt1 nodes together and form the new product graph.

Figure 3:
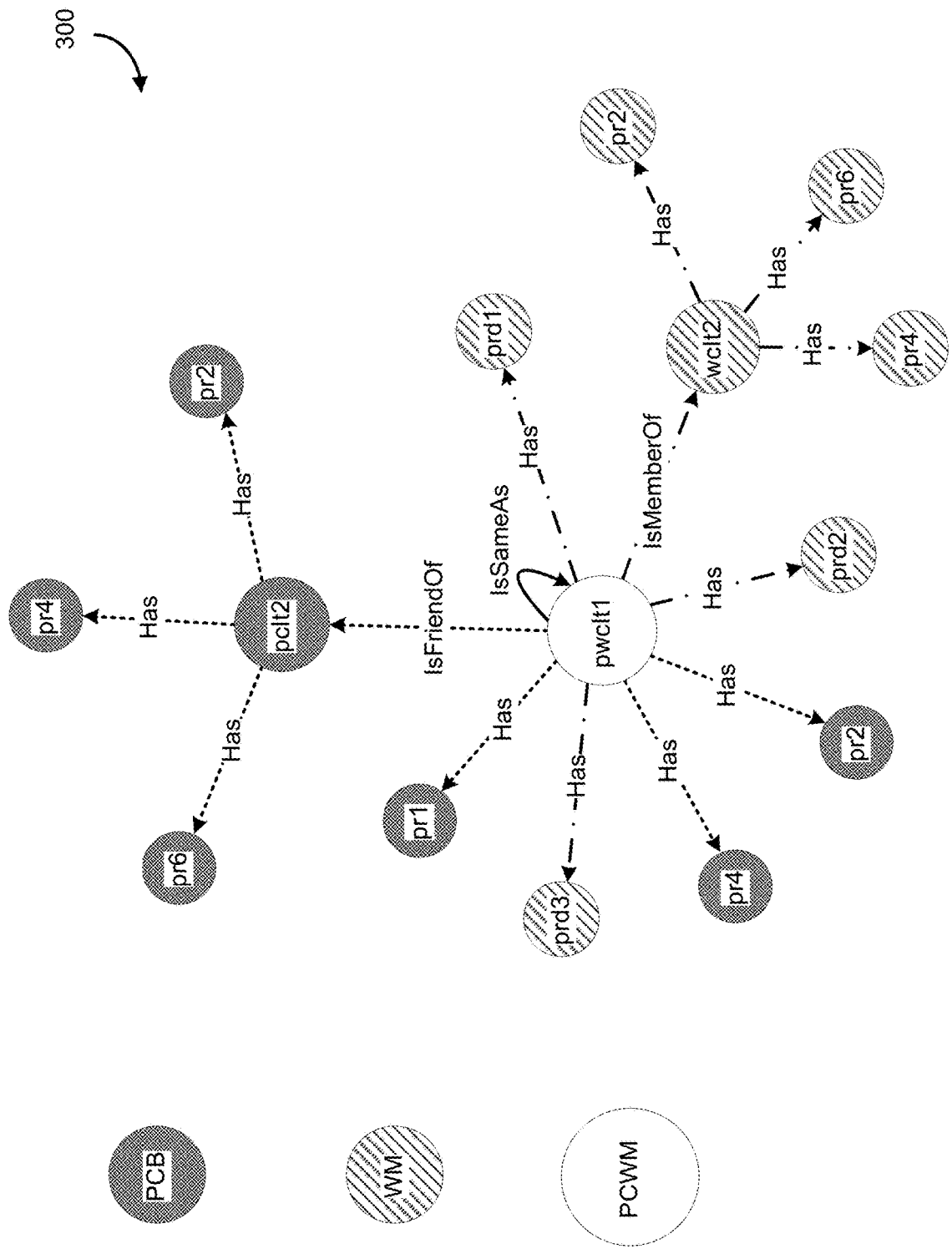
FIG. 3 is a graph object showing a new product graph, according to some embodiments.

FIG. 3 is a graph object showing a new product graph, according to some embodiments. Graph 300 is an example quotient graph of Financial Institution product graph.

Figure 5A:
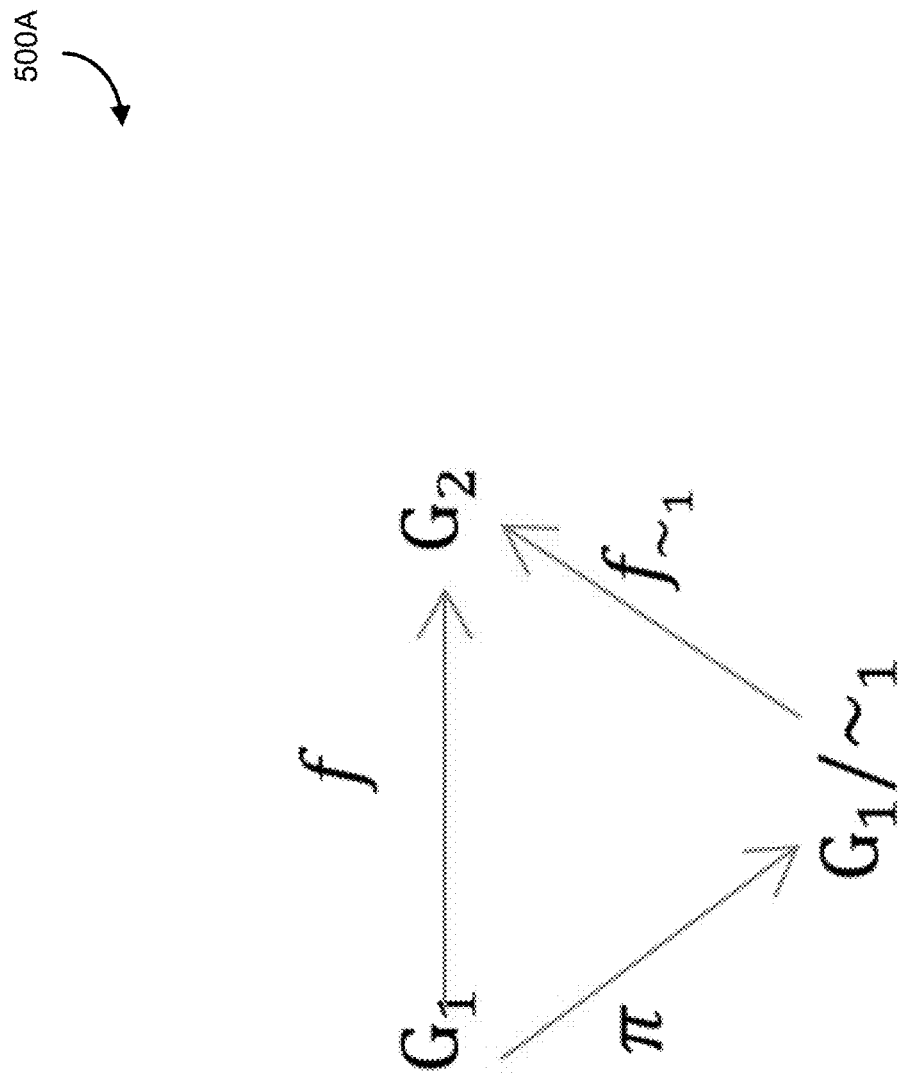
FIG. 5A is a diagram of an example graph homomorphism, according to some embodiments.

Given two sets of data sets $G_1$ and $G_2$, an equivalence relation $\sim_1$ on $G_1$, and a graph homomorphism $f:G_1 \to G_2$ such that $v_1 \sim_1 v_2$ implies $f(v_1) \sim_2 f(v_2)$ then there are induced functions $\pi: G_1 \to G_1/\sim_1$ and $f_{\sim_1}: G_1/\sim_1 \to G_2$ such that $f = f_{\sim_1} \pi$ has a relationship shown at 500A on FIG. 5A.

Figure 5B:
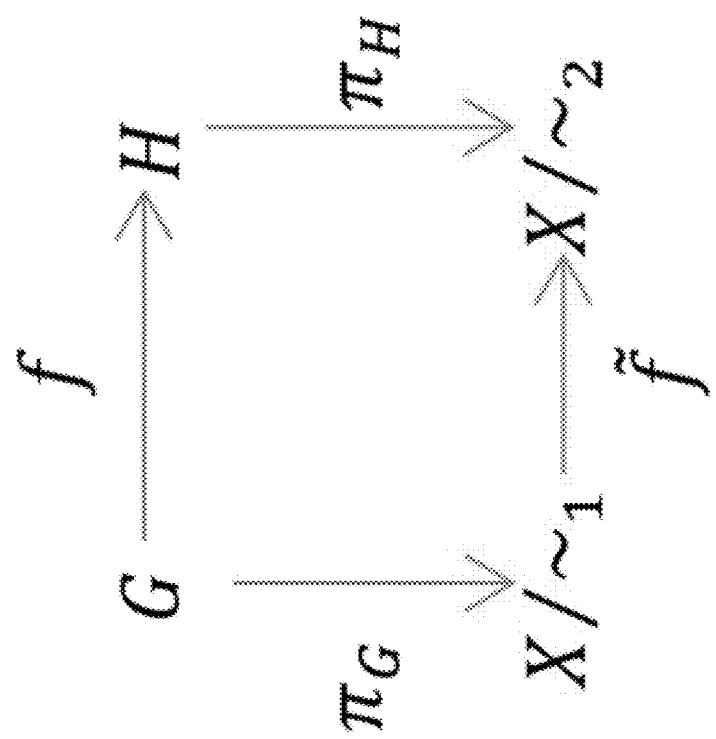
FIG. 5B is an example commutative diagram, according to some embodiments.

Let $\sim_1$ and $\sim_2$ be equivalence relations on graphs G and H, respectively and let $f:G \to H$ be a graph homomorphism such that $u \sim_1 v \Rightarrow f(u) \sim_2 f(v)$. Then the system has the commutative diagram 500B of FIG. 5B, where $\tilde{f}$ is defined by $\tilde{f}([u]) = [f(u)]$.

There is a graph homomorphism $\pi_\sim$ from Financial Institution product graph (FIG. 1) to Quotient graph of Financial Institution product graph (FIG. 3) given by sending both pclt1 and wclt1 nodes to pwclt1 node and all other nodes and edges to themselves.

Graphs can be reviewed as pre-sheaves and so the category of graphs is complete and co-complete. Some of special limits and co-limits of graphs, such as products, co-products, pullbacks, pushouts, are described as follows.

Graph Operations

The product of two graph G and H is the graph $G \times H$ with the vertex set $V(G \times H) = V(G) \times V(H)$, in which $(u,v)(u',v') \in E(G \times H)(u,v)$ whenever $uu' \bigstar E(G)$ and $vv' \in E(H)$.

The disjoint union of two graph G and H is the graph $G+H$ with the vertex set $V(G) \uplus V(H)$ and the edge set $E(G) \uplus E(H)$.

Given two graph homomorphisms $f:X \to Z$ and $g:Y \to Z$, Let P be the graph defined as follows:

$V(P) = \{(x,y) | x \in V(X), y \in V(Y) \text{ such that } f(x) = g(y)\}$ and $(x,y)(x',y') \in E(P) \Leftrightarrow xx' \in E(X) \text{ and } yy' \in E(Y).$ $p_1: P \to X$ and $p_2: P \to Y$ are given by $p_1: (x,y) \mapsto x, (x,y)(x',y') \mapsto xx'$ and $p_2: (x,y) \mapsto y, (x,y)(x',y') \mapsto yy'$ respectively.

Connected Components

A connected-component of a graph is a maximal subgraph in which any two vertices are connected by paths: a finite sequence of edges which joins a sequence of vertices in the graph. A graph database may have connected-components which are subgraph databases, i.e., graph databases in themselves.

Connected-components can also be defined via the equivalence classes of a reachability equivalence relation. In a graph, a vertex v is reachable from a vertex u if there is a path from u to v. Then connected-components are the induced subgraphs formed by the equivalence classes of the reachable equivalence relation.

In a graph object or graph database wherein the vertices are tables, the connected-components may be associated with separate products (loans or investments), sectors (insurance or banking), client groupings (business or individual), or other groupings relevant to the technical characteristics of the data.

Figure 4:
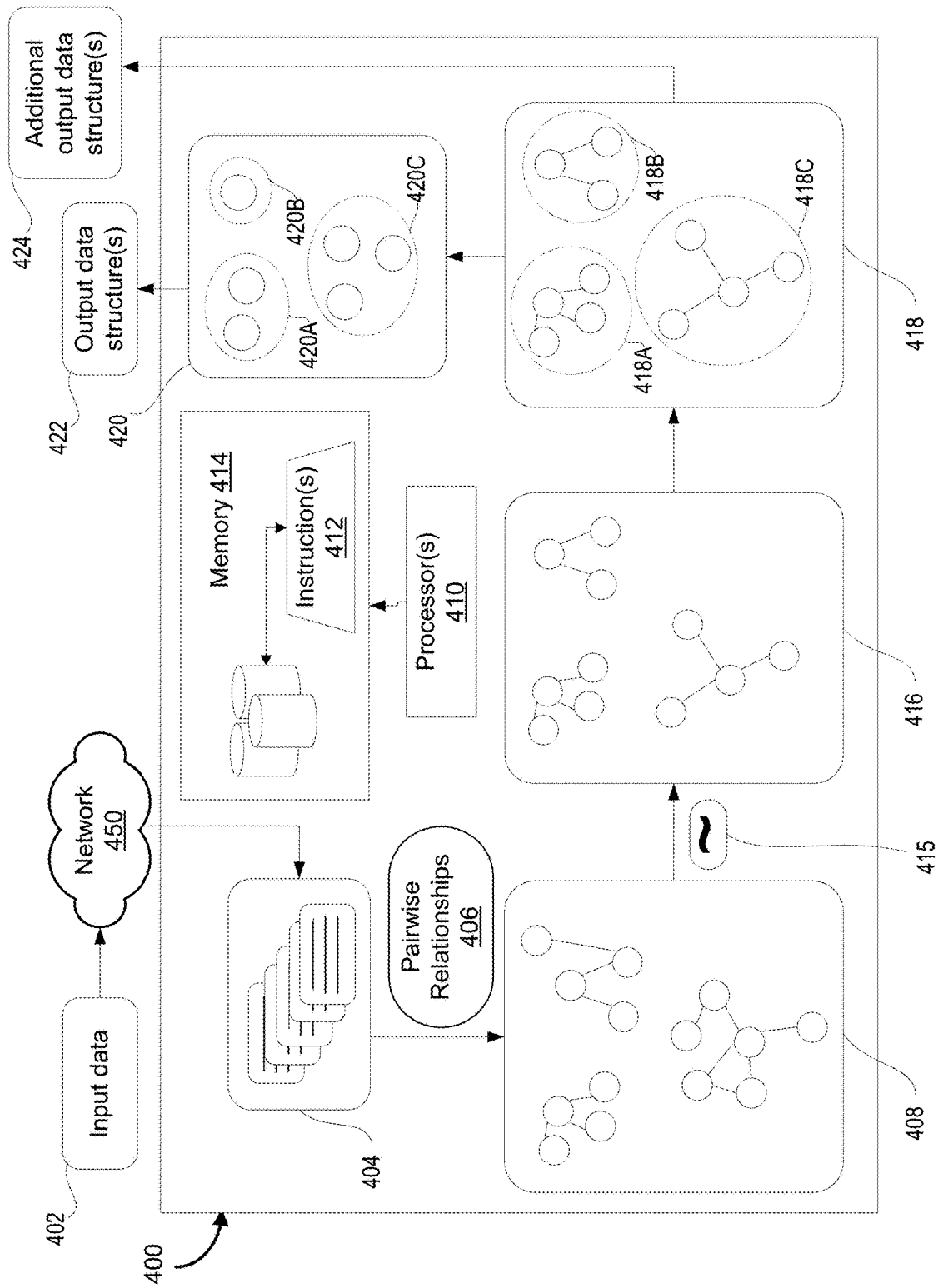
FIG. 4 is a schematic of an exemplary system.

FIG. 4 is a schematic of an exemplary system 400 for generating a storage-efficient data structure (output data structure(s) 422) representing a plurality of inter-related data tables 404 and adapted for use in data processing, e.g., for use in data lineage analysis, entity resolution, or for probing database schema. The system comprises a processor(s) 410, memory 414, instructions 412 stored on the memory 414. The system receives input data 402, e.g., indicative of data tables representing graph or relational databases. The data so received may be cleaned and/or normalized by the system 400. In various embodiments, the input data 402 may be received over a network 450.

The system 400 is intended to be implemented in the form of a computer system (e.g., a computer server), and in some embodiments, can include a microprocessor, a computer processor, an integrated circuit, an application-specific integrated circuit, among others, and can be housed, for example, as a physical standalone computer device, as a distributed set of computing resources (e.g., a cloud implementation) connected across one or more networks, or within a data center (e.g., as a computing appliance coupled to a messaging bus).

The system 400 is configured to evaluate the data tables 404 and determines relationships between them. In some embodiments, data tables 404 are compared and common elements are sought between data tables 404 to establish such relationships, e.g., common rows and/or columns. Based on this information, a graph database (graph object) 408 is generated. The graph database 408 has as its vertices (see white circles in the graph database 408), the data tables 404 from the input data 402, i.e., the graph maps interconnectedness or inter-relatedness of the data tables 404. The relationships between the data tables 404 are pairwise relationships 406, i.e., they are relationships between two data tables. Thus, these appear as edges (lines joining the circles) on the graph database 408. In some embodiments, the edges represent common elements shared between two of the data tables 404.

An equivalence relationship 415 ("~") is then used to partition the graph database 408, i.e., to split the vertices up into smaller sets based on equivalence classes of ~ (e.g., vertices A and B are in the same set if and only if A-SB). The partition defines a quotient graph.

As a result, a reduced graph database 416 is obtained. Each equivalence class is represented by a single vertex in the reduced graph database 416 (akin to the quotient graph). The connected-components 418 of the reduced graph database 416 are then determined, e.g., using a breadth-first or depth-first search algorithm, yielding a plurality of connected-components 418A, 418B, 418C. Each connected-component represents a smaller grouping than the full graph database 408 (or reduced graph database 416), and which each can then be manipulated and transformed separately, thereby reducing the computational cost. Each of the connected-components is then searched for proper subsets that can be used to generate the connected-component.

These are the irreducible generators 420A, 420B, 420C—in particular the set of irreducible generators includes no smaller grouping (a proper subset) that can then be used to generate the connected-component. For example, the irreducible generators 420A may generate the connected-component 418A, the irreducible generators 420B may generate the connected-component 418B, and so on. In some embodiments, the connected-components 418 themselves are additionally or alternatively output by the system as part of the output data structure 422. In some embodiments, all of the irreducible generators 420 together may then be output as an additional output data structure 424.

Figure 6:
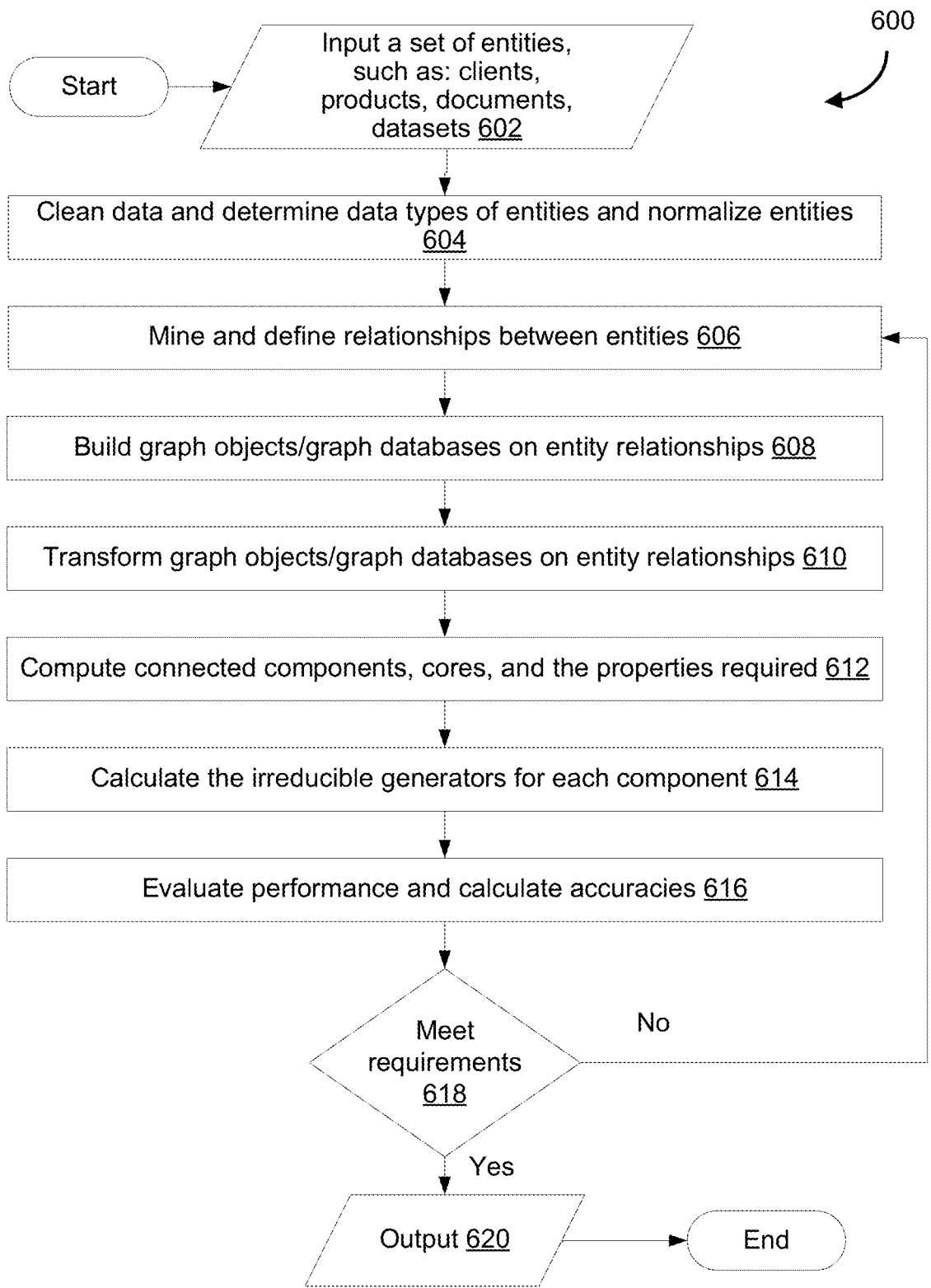
FIG. 6 is an example workflow diagram showing an example method, according to some embodiments.

FIG. 6 is an example workflow diagram showing an example method, according to some embodiments. FIG. 6 provides walkthrough example 600 using dataset relationship detection in Financial Institution HDFS clusters.

For example, consider all data sets in Financial Institution HDFS, one may want to detect relations among these datasets so that the system can understand how they are related, which data sets are most important, and which are redundant, so that the redundant tables can be removed and the database schema can be derived from the relationships.

Usually, tables in database are generated from a finite set of tables, called generators, by using database operations such as join, meet, combine, subset, etc. So one defines the relation between two tables by checking if there are some common rows and columns (common elements) between them. The system first establishes the relation among the 16 tables. Since the system considers common rows and columns, the system uses table headers to build blocks. Graph, graph quotient, graph operations, connected components, etc.

After starting the process, the set of entities (such as expressed in inter-related databases) are first input at step 602. In some embodiments, then the data is cleaned, normalized and characterized at step 604.

In some embodiments, at step 608 the graph objects or graph databases are built based on entity relationships, e.g., common elements establishing relationships between data tables (which are the vertices of the graph objects).

In some embodiments, at step 610, the graph objects or graph databases are transformed based on entity relationships, e.g., by defining an equivalence relation on the graph database, defining a partition over the graph database based on the equivalence relation, and retaining only one vertex per equivalence class in the partition.

In some embodiments, at step 612, connected components, cores, and the properties (e.g., required for the output) are computed.

In some embodiments, at step 614, the irreducible generators for each component are calculated.

The performance and accuracies are calculated at step 616. If satisfactory, the connected components, irreducible generators and/or other graph objects are sent to the output 620. If not, the process starts again where the relationships between vertices are defined (step 606) and re-determined.

An example walkthrough the main work flowchart by the 14 tables shown in FIG. 7A, FIG. 7B, FIG. 7C, FIG. 7D, FIG. 7E.

Step 1: receive input data indicative of inter-related data tables, e.g., the data tables may be inter-related by having common elements describing a common set of entities, such as: clients, products, documents, and datasets. For example, then the input data is loaded/ingested into the system or framework (all 14 data sets).

Step 2: clean data, determine data types of entities and normalize entities. Data sets are usually noisy with different formats. The system first cleans and normalizes the data sets. For example, Table21 above has an empty row and one row duplicates. Its Phone and Account columns were formatted in the different ways. Table3 has two row duplicates. Within the framework, the system normalizes them to the following table:

Step 3: mine and define relationships between entities. To determine if two tables are related or similar (have common elements), the system needs to first if they have common column fields and then compare the tables and see if there are some common row and columns by using their fields as the blocks pairwise. There are 91 pair comparisons, the following are the first 25 comparison (see FIG. 8, which shows a subset of table comparison results 800).

Step 4: Build graph objects or graph databases based on entity relationships, e.g., common elements. After establishing the common row and column relationship among the tables, the system builds the graph object/database for the relationship: nodes: the tables, Edges: common row and column relations. The first 25 comparisons are displayed by the subgraph of the whole database, shown as FIG. 9.

FIG. 9 is a graph representation of relationships of FIG. 8, according to some embodiments. In the graph 900, the connections are shown having rows and columns relations indicated on the interconnections, e.g., "5r, 3c" means the connected vertices have 5 rows and 3 columns in common.

This is representative of the relationship between the two vertices of the particular edge or interconnection. Such notation is adopted throughout the remainder of application. In this example, only the number of common rows and columns are considered. In other embodiments, the exact location of the rows and columns may also be considered, as may other aspects of the relationship.

Figure 10:
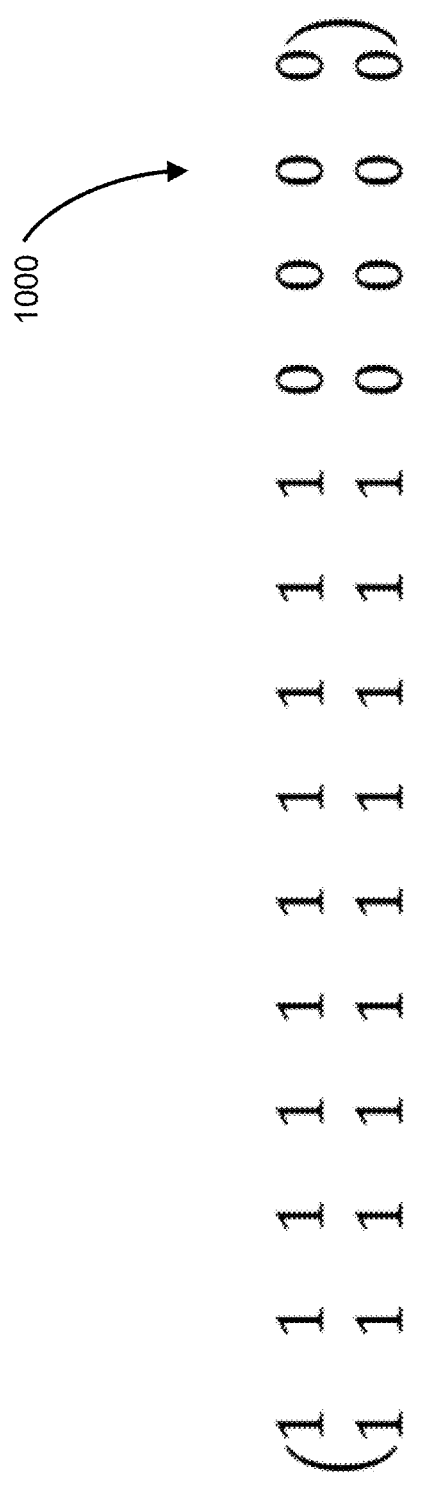

The adjacency matrix with the vertices {Table1, Table11, Table12, Table13, Table2, Table21', Table22, Table1_2, Table1_2_1, Table1_2_3, Table3', Table3_1, Table3_2, Table3_3} is a 14×14 matrix, whose first 2 rows is shown in the object 1000 of FIG. 10. FIG. 10 shows a portion of the 14×14 adjacency matrix, according to some embodiments.

Step 5: Transform graph objects/graph databases on entity relationships. There are a lot of tables that are duplicates or just a sub-table of another table. For example, Table 1, Table11, and Table12 are the same while Table13 is their sub-table. To reduce the computing and increasing the accuracies, the approach needs to map the complex graph environment to a simple environment using graph operations, quotient graphs, and graph homomorphisms. In this scenario, the approach builds an equivalence relation on the 14 tables so that the quotient graph and graph homomorphism can be derived.

Figure 13:
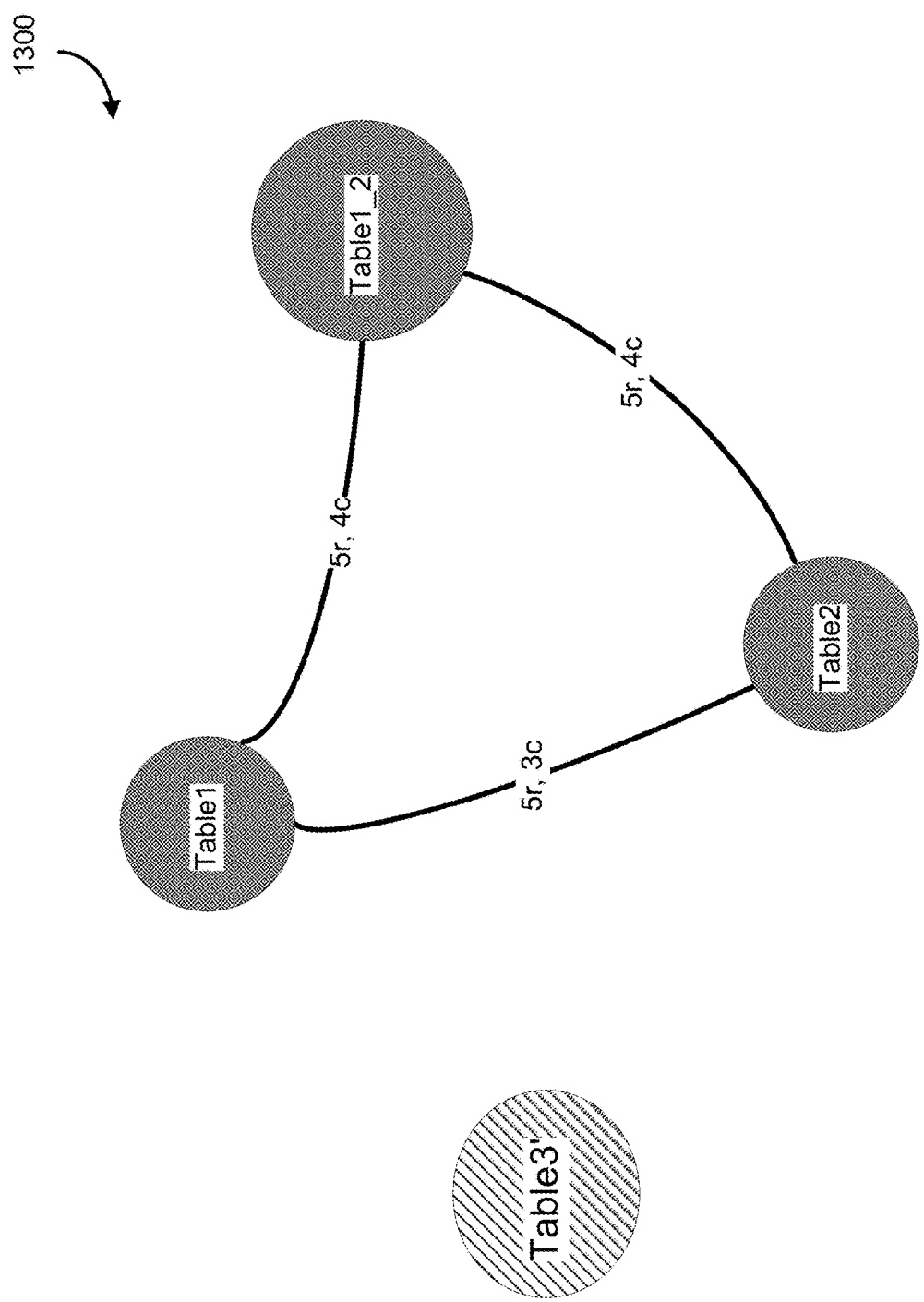
FIG. 13 is an example graph representation, according to some embodiments.

The equivalence relation 1100 is given by the partitions of FIG. 11 among the 14 tables. Choosing Table1, Table2, Table1_2, and Table3' as the representations of the partitions, the common row and column relationship graph provided in FIG. 12 are shown (showing relationships between table representations within a quotient graph) in 1200. FIG. 13 is a graph representation 1300 of relationships of FIG. 12. As before, the common rows and columns are indicated on the edges (interconnections). Thus, "5r, 3c" between Table1 and Table2 means Table1 and Table2 have 5 rows and 3 columns in common. A partitioning of the vertices is also shown by the shading.

Note that equivalence relations, quotient graphs, homomorphism, may be considered different representations of the partition. However, a homomorphism is generally not bijective and the quotient graph defines a kernel (an equivalence relation).

Figure 14:
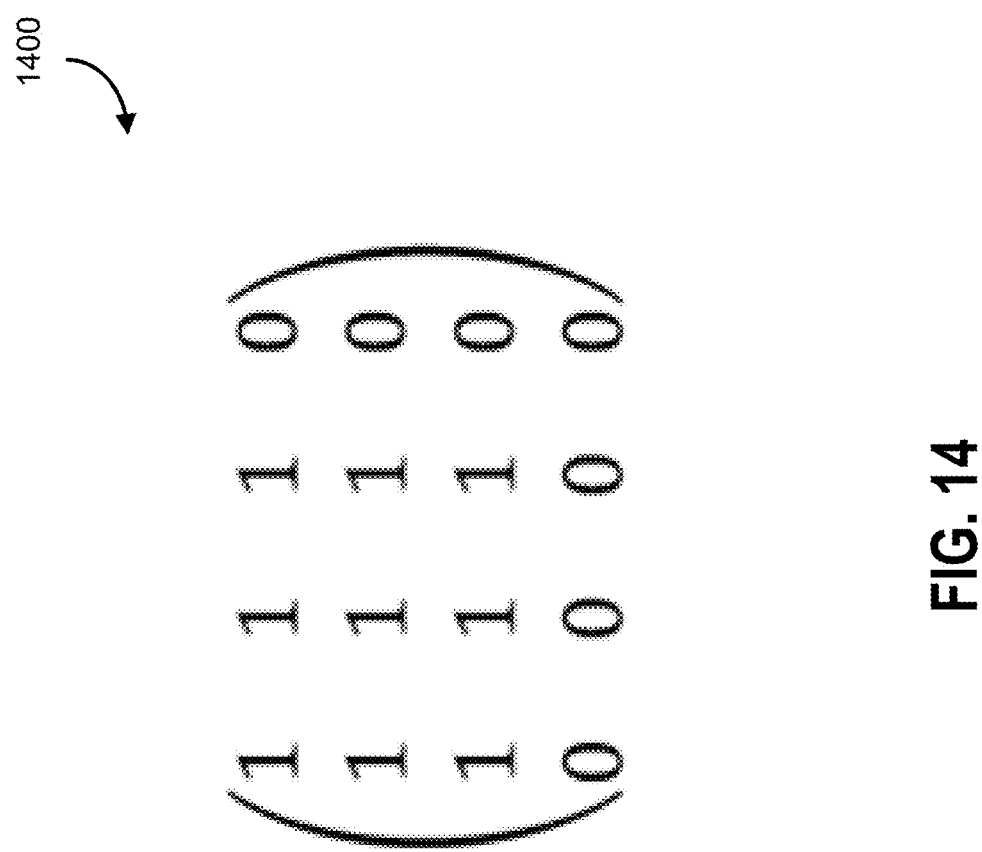
FIG. 14 is an example adjacency matrix, according to some embodiments.

The adjacency matrix 1400 with the vertices {Table1, Table1_2, Table2, Table3'} is shown at FIG. 14. The original 14×14 adjacency matrix in Step 4 is transformed to the above 4×4 adjacency matrix after forming quotients and operations on graph objects.

Step 6: Compute connected components and cores. There are two connected-components in the case: {Table1, Table2, Table1_2} and {Table3'}.

Step 6A: In some embodiments, a k-core decomposition may be performed to obtain information regarding connectivity of the data and to assess risk. In this optional approach, k-core decompositions at different values of k can be conducted to identify risk spreading at different levels of k. For example, for a financial institution, entities, risks, interactions, and their graphs dynamically change in a high dimension space including temporal and spatial dimensions. Influencers can appear or disappear on different time scales in the graphs.

Topological metrics, such as centrality, can fluctuate strongly over time and locations. Hence identifying single influent entities for risk spreading can be challenging in practice. Graph structures, rather than the metrics on single nodes play an important role in entity risk spreading. The core structures decompose the graphs into hierarchies of subgraphs that are increasingly densely connected and therefore provide useful information for risk spreading using graphs. Differences can be analyzed as between different k-cores to automatically measure a risk spreading value, for example, which can then be derived and rendered into a specific graphical output or reporting output (e.g., an output data structure value).

Step 7: Determine the irreducible generators for each component. Given a database D, a set G of generators of D is irreducible if no proper subsets of G can generate D (i.e., subsets that are strictly contained within and not equal to G). If D has a finite set H of generators, then it can be verified whether $h \in H$ can be generated from the elements other than h in H. If the answer is "yes", then h is redundant with respect to H and so it can be removed from H. Otherwise, the processor(s) continue on to verify other elements in H. Since H is finite, the process eventually stops and does not remain on an infinite loop. In some embodiments, the processor may advantageously search for irreducible generators after isolating connected-components since otherwise the computational overhead may be excessive. The irreducible generators for the two components are {Table1_2, Table3}, which give that database schema for the 14 tables.

Step 8: Evaluate performance and calculate accuracies. If machine learning algorithms are being used in the loop, e.g., to compute connected-components or in other parts of the algorithm, the system can be evaluated to check if performance objectives are being met. For example, entity matching may be 98.6% correct, while quotient graph, graph transformation may be 100% correct, and the irreducible generators may be 100% correct.

The problem may have inherent uncertainty when comparisons or benchmarking is done. For example, if data is aggregated and includes apartment number, and street number, sometimes the street name may be labelled by "street", whereas as other times, it may be labelled "str". Thus, similarity comparisons may be commonly subjected to data noise or data dirtiness. But unfortunately—even if all metadata is available, there is still some uncertainty.

Step 9: Check if the performance scores and accuracies meet the requirements. Check if the performance scores and accuracies meet the business requirements. For the walkthrough example of dataset relationships, the performances and accuracies meet the requirements. So go to the next step: Step 10. Otherwise, go to Step 3 and retrain/build entity relationships and graph transformations and operations. In various embodiments, if the accuracies are not met, the partitions may be changed or a different representative member may be selected for the partitions (for example).

Step 10: Output is generated from the system. For example, output data structures may be generated. These may be transmitted over a network, e.g., to a terminal. The terminal may be configured to allow users or other agents to generate data table relationships and graph databases. Example output data structures may include normalized (data) tables, details on relationships between data tables (e.g., table relationship matrix), graph adjacency matrices representing the relationships between data tables (e.g., in this case, only binary entries may be used in the adjacency matrix based on whether there is a relationship or not). In some embodiments, connected-components may be output in data structures. For example, output data structures may be indicative of connected-components. Output data structures may include connected-component IDs, generators, along with accuracies or other performance metrics.

As yet another non-limiting example, consider the following scenario: Data quality may be crucial for a financial institution. The more high-quality data one may have, the more confidence one can make decisions with.

Data quality is strongly related to data lineage: data's life cycle or the full data journey, which includes: where the data originates, how it has gotten from one point to another and where it exists today. Data lineage is very important in many lines of business of a financial institution. For example, to manage data risk better, one may need to track the roots of risk data by its lineage. Qualities of a financial institution's AI models may depend on their training data entities which are linked by their lineages. Hence Chief Data Office asks a data science team to mine the lineages from a given database.

Figure 15:
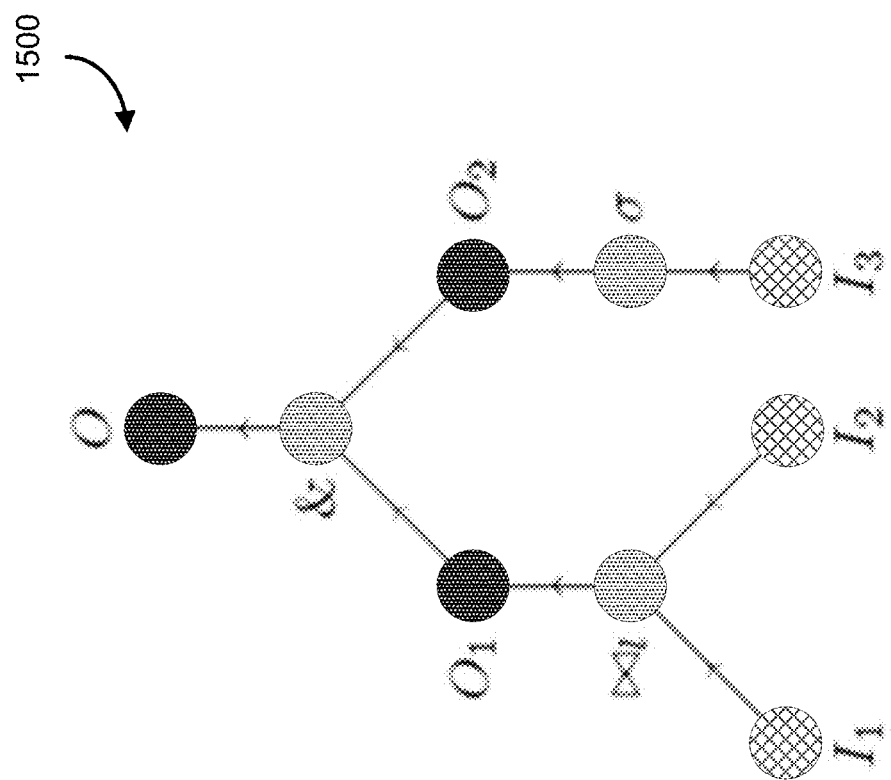
FIG. 15 is a graph representation of a data lineage with join ⋈, select σ, and combine &, according to some embodiments.

Given a database operation T, a data lineage element for T consists of a triplet $\langle I,T,O \rangle$, where I is the set of inputs to T and O is the output, a data set or a set of data sets. Each data set S in the database can be viewed as a data lineage element because of the triplet $\langle S, id, S \rangle$, where id is the operation given by the identity transformation. Two data lineage elements $\langle I,T,O \rangle$ and $\langle I',T',O' \rangle$ can be composed or concatenated if O=I' or O'=I. A finite set of composable data lineage elements forms a data lineage, which can be represented by a directed graph, for example, FIG. 15 which is a graph representation of a data lineage with join ⋈, select σ, and combine &, shown in 1500. In FIG. 15, the hatched and dark shaded circles represent databases or datasets while the medium shaded circles are operations (as indicated by placement of database operation symbols adjacent thereto).

Given a finite set of data set generators and a finite set of operations, a database can be generated by the operations, such as, join ⋈, meet, combine &, select σ, subset, . . . , from the generators. Conversely, given a database and a set of database operations used in the database, the system can mine the generators using the described approaches and so data lineages in the database can be discovered.

An example walkthrough the main work flowchart by the 12 tables shown in FIG. 16A at 1600A, FIG. 16B at 1600B, FIG. 16C at 1600C, FIG. 16D at 1600D.

Step 1: receive input data indicative of inter-related data tables, e.g., the data tables may be inter-related by having common elements describing a common set of entities, such as: clients, products, documents, and datasets. Input a set of entities, such as: clients, products, documents, and datasets. Load/Ingest all 12 data sets into the framework or system.

Step 2: Clean data and determine data types of entities and normalize entities. Data sets are usually noisy with different formats. The system may first clean and normalize the data sets. For example, d21 above has an empty row and one row duplicates. Its phone and account columns were formatted in the different ways. Within the framework, the system normalizes them to the following table, FIG. 16D.

Figure 17:
FIG. 17 is a table showing a subset of table comparison results, according to some embodiments.

Step 3: Mine and define relationships between entities. To determine if two tables are related or similar (have common elements), the system needs to first see if they have common column fields and then compare the tables to figure out if there are some common row and columns by using their fields as the blocks pairwise. There are 66 pair comparisons, the following are the 27 comparison (see FIG. 17, which shows a subset of table comparison results 1700).

Step 4: Build graph objects/graph databases on entity relationships. After establishing the common or similar row and column relationship among the tables, the system builds the graph object/database for the relationship with, nodes: the data sets, edges: common/similar row and column relations between data sets.

The 27 comparisons above are displayed by the subgraph, as shown in FIG. 18. FIG. 18 is a graph representation of relationships of FIG. 17, according to some embodiments. In the graph 1800, the connections are shown having row and column relations indicated on the interconnections (in the same notation described earlier, e.g., "5r, 4c" means 5 rows and 4 columns in common.

The adjacency matrix of shaded subgraph from FIG. 18 is the 7×7 matrix 1900, as shown in FIG. 19.

Step 5: Transform graph objects/graph databases on entity relationships. There are some data sets that are duplicates or just a sub-table of another table. For example, data sets d1, d11, and d12 are the same while d2 and d21 are the same. To reduce the computing and increasing the accuracies, the system needs to map the complex graph environment to a simple environment using graph operations, quotient graphs, and graph homomorphism. In this scenario, the system builds an equivalence relation on the 12 data sets so that the quotient graph and graph homomorphism can be derived.

Figure 20:
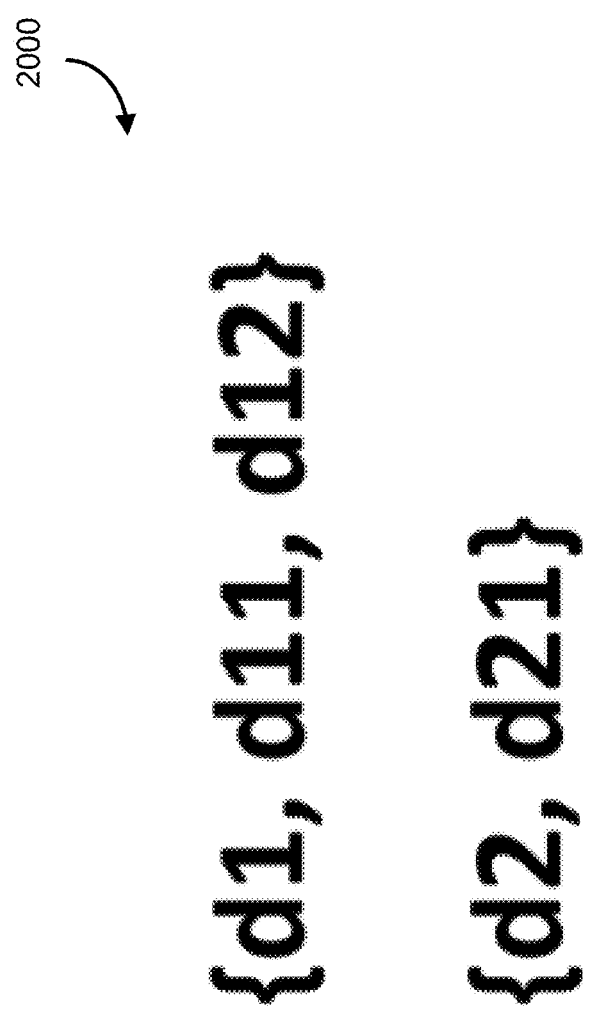

The equivalence relation 2000 is given by the partitions of FIG. 20 among the 12 tables. Note that FIG. 20 only shows the non-trivial equivalence classes. Each of the other tables is only equivalent to itself (trivial equivalence classes). These are vertices d1021 (the equivalence class {d1021}) and d102 (the equivalence class {d102}), are also needed to fully capture the graph database.

Figure 21:
FIG. 21 shows the relationships between table representations with the quotient graph, according to some embodiments.

Choose a representation for each partition: D1 represents {d1, d11, d12} and D2 {d2, d21}, i.e., D1 may be any one element of the set {d1, d11, d12} and D2 may be any one element of the set {d2, d21}. Using the equivalence relation and the quotient graph, FIG. 17 can be simplified as the following common row and column relationship, as shown in FIG. 21. FIG. 21 shows relationships 2100 between table representations with the quotient graph.

Figure 22:
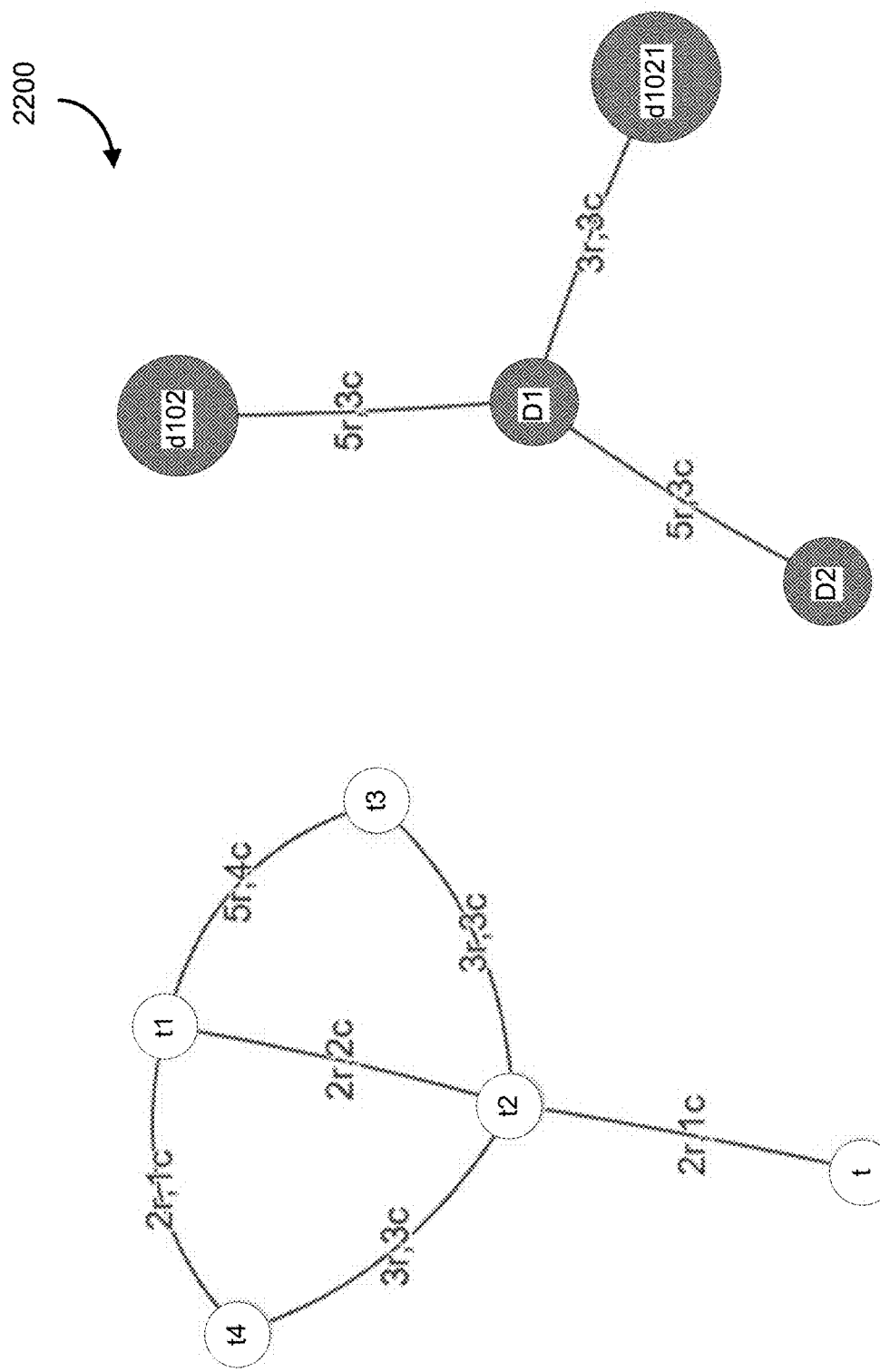
FIG. 22 is an example quotient graph of FIG. 18, and illustrates a graph representation of relationships in FIG. 21, according to some embodiments.

FIG. 22 is a quotient graph of FIG. 18, and illustrates a graph representation 2200 of relationships in FIG. 21.

The adjacency matrix of shaded subgraph from FIG. 22 is the 4×4 matrix 2300, as shown in FIG. 23. Hence the number of nodes of shaded subgraph is reduced from 7 to 4 and the size of the adjacency matrix is reduced from 7×7 to 4×4 by using the quotient graph or graph homomorphism.

Step 6: Compute connected-components or/and cores. There are two connected-components in the case: {d1, d2, d102} and {t1, t2, t3, t}, Step 6A: In some embodiments, a k-core decomposition may be carried out, e.g., to assess risk. This step can be similar to that described in the previous example embodiment in respect of the use of different k-cores for risk assessment across different timeframes.

Step 7: Calculate the irreducible generators for each component. The irreducible generators for the two components are {d1, d2} and {t1, t2}, which give that database schema for the 12 tables, respectively.

Step 8: Evaluate performance and calculate accuracies. With the training sets in the frame, the system can calculate the accuracies of the models related: Entity matching: 97.9%, quotient graph and graph Transformation: 100%, Irreducible generators: 100%.

Step 9: Check if the performance scores and accuracies meet the requirements Check if the performance scores and accuracies meet the business requirements. For the walk-through example of dataset relationships, the performances and accuracies meet the requirements. So go to the next step: Step 10. Otherwise, go to Step 3 and retrain/build entity relationships and graph transformations and operations.

Step 10: Output is generated from the system. For example, output data structures may be generated. These may be transmitted over a network, e.g., to a terminal. The terminal may be configured to allow users or other agents to generate data table relationships and graph databases. Example output data structures may include normalized (data) tables, details on relationships between data tables (e.g., table relationship matrix), graph adjacency matrices representing the relationships between data tables (e.g., in this case, only binary entries may be used in the adjacency matrix based on whether there is a relationship or not). In some embodiments, connected-components may be output in data structures.

For example, output data structures may be indicative of connected-components. Output data structures may include connected-component IDs, generators, along with accuracies or other performance metrics. From generators, the system may track back to have the following data lineages represented by graphs, as seen in FIG. 24.

Figure 24:
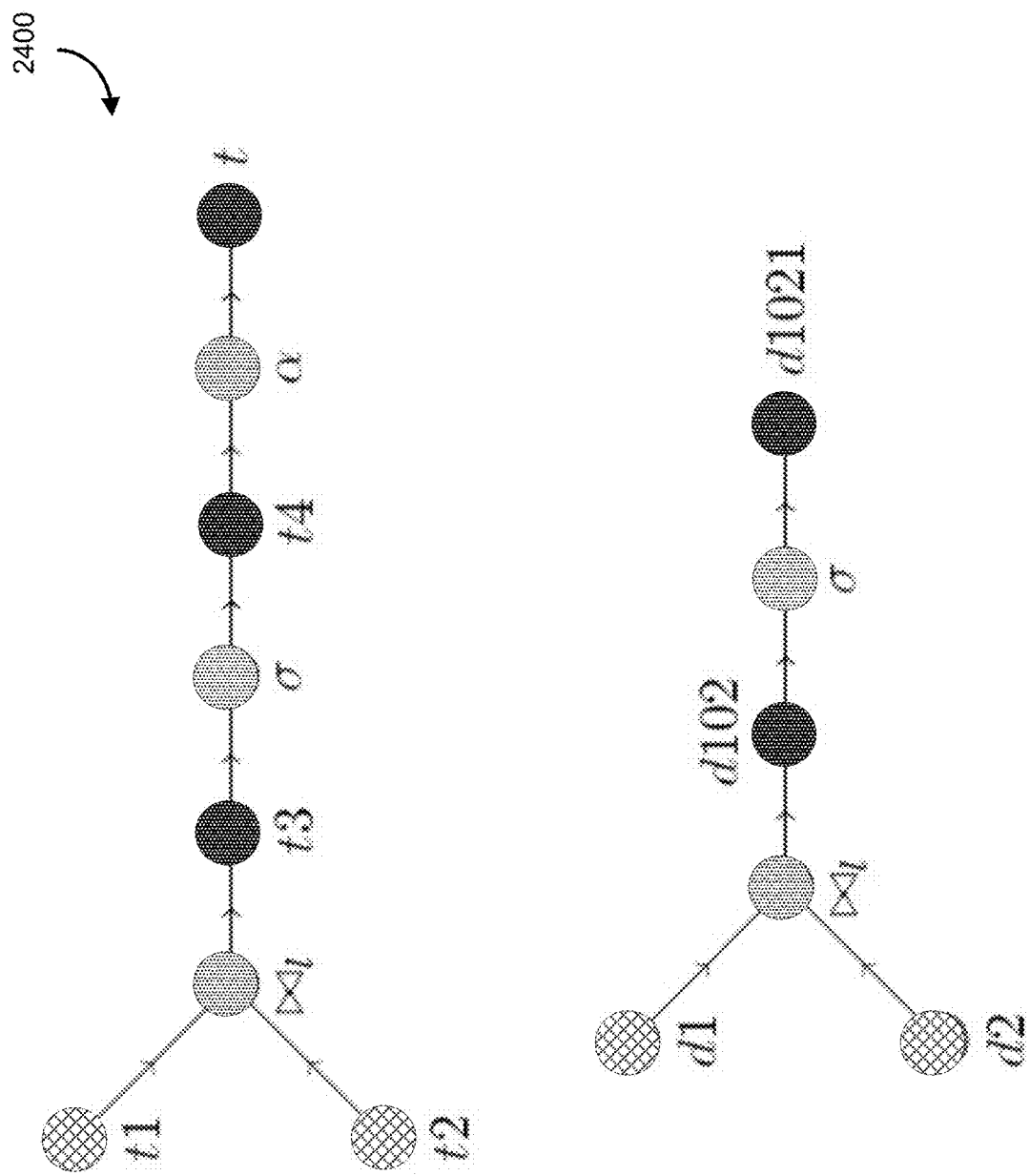
FIG. 24 is an example graph representation of two main data lineages output, according to some embodiments.

FIG. 24 shows graph representation 2400 of two main data lineages output, where operations are shown in light stippling (the symbols a, etc.). Tracking back may include generating candidate data lineage by performing data operations thereon. In some embodiments, finding the irreducible generators may be sufficient since all the information contained in the database may be derived from the irreducible generator and thus it may be sufficient to subject only the irreducible generator to a data audit. In this approach no recourse to metadata or manual auditing of data may be needed.

The approaches in the above two examples may be applicable to any financial institution entity relationships/graphs, for example. The entities can be not only data sets/tables but also any other entities, such as, websites, payment systems, AI models, etc. Consider a financial institution's websites as the entities, for example, and using clients' click streams or click paths to link the entities together. The system can merge certain groups of the financial institution's websites together by, for instance, their interconnection scores, to simplify the overall map of all the financial institution's websites and make the financial institution path analysis much smoother and more human perceivable with graph homomorphisms and quotient graphs.

In some embodiments, the described system may merge multiple systems together, for example, for a financial institution. The system may discover data lineages in a data lake to manage data risk better. The system may merge multiple house holding relationships in multiple systems of a financial institution. In some embodiments, the system may power natural language processing for call centers and/or document analysis. The system may also analyze and clean up Hadoop™ clusters, of a financial institution, for example.

Figure 25:
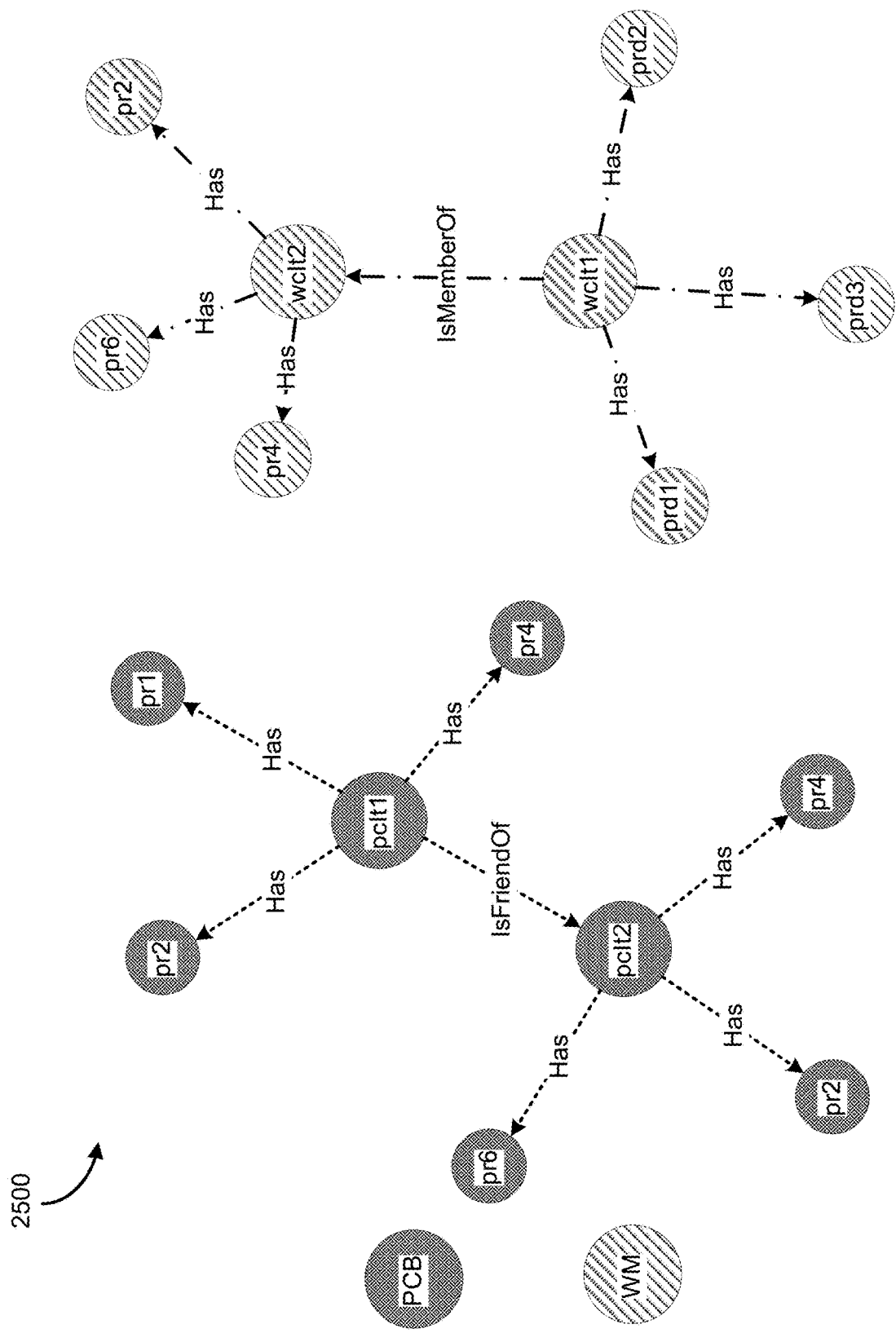
FIG. 25 is an example graph showing graphs from data from two different sources, according to some embodiments.

FIG. 25 is an example graph 2500 showing graphs from data from two different sources, according to some embodiments.

Figure 26:
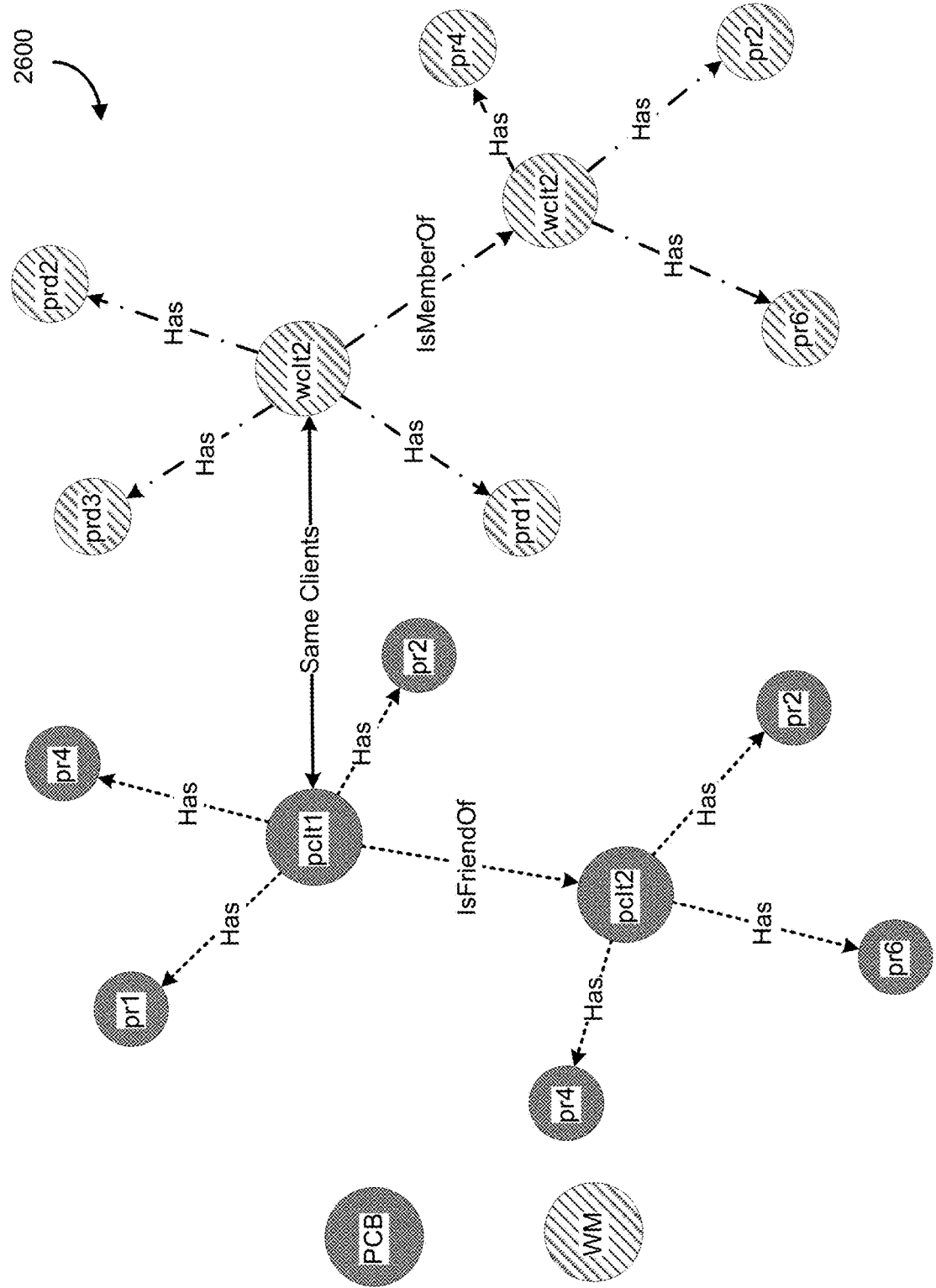
FIG. 26 is an example graph showing linkages between the two graphs (a client from the first graph and the same client from the second graph are matched so that two components are linked so that the system can show better recommendations for products, according to some embodiments.

FIG. 26 is an example graph 2600 showing linkages between the two graphs (a client from the first graph and the same client from the second graph are matched so that two components are linked so that the system can show better recommendations for products, according to some embodiments.

Figure 27:
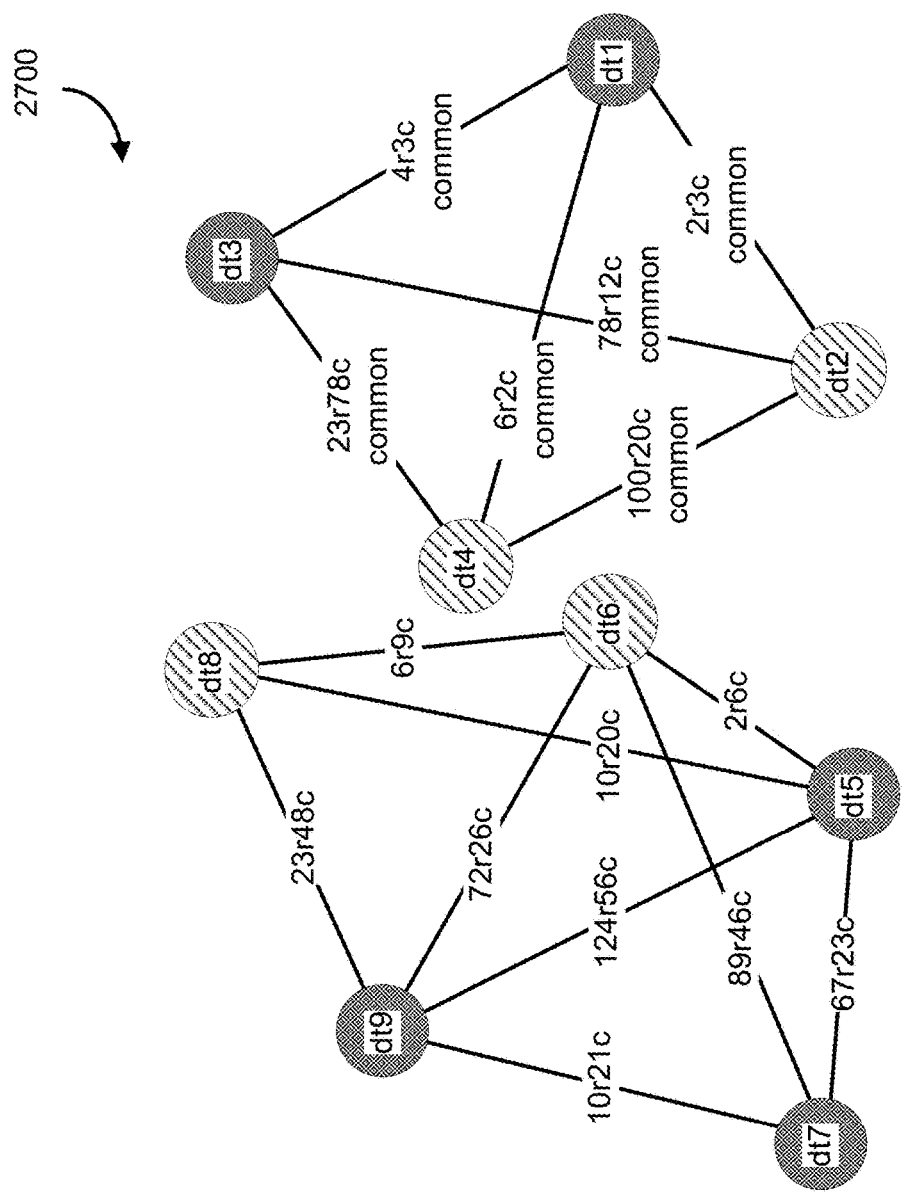
FIG. 27 shows a relation graph for 9 data sets in database is displayed with 2 connected components, where irreducible generators for each component can determined, according to some embodiments.

FIG. 27 shows a relation graph 2700 for 9 data sets in database is displayed with 2 connected components, where irreducible generators for each component can determined, according to some embodiments.

Figure 28:
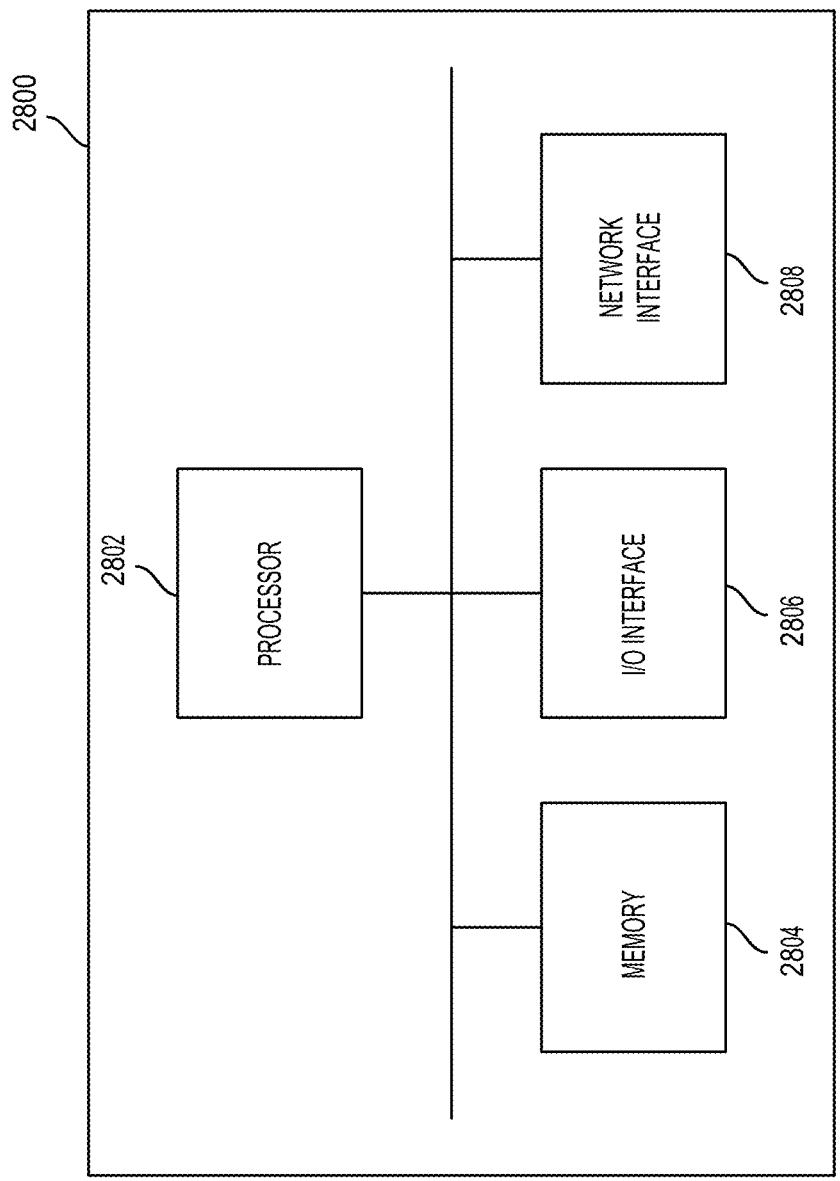
FIG. 28 is an example computing device, according to some embodiments.

FIG. 28 is an example computing device 2800, according to some embodiments. The example computing device 2800 includes a processor 2802, which could be a hardware processor such as a microprocessor or a processor on a chip. The processor 2802 receives machine interpretable instructions and executes them in conjunction with computer memory 2804, which can include read only memory, random access memory, among others. The input/output interface 2806 is adapted to receive inputs from devices, such as keyboards, mice, among others, and network interface 2808 includes messaging components that are configured to couple to a network for transmitting data packets indicative of data sets. The computing device 2800 can be utilized to implement the system 100 as described in FIG. 4 or in various embodiments described herein.

Figure 29:
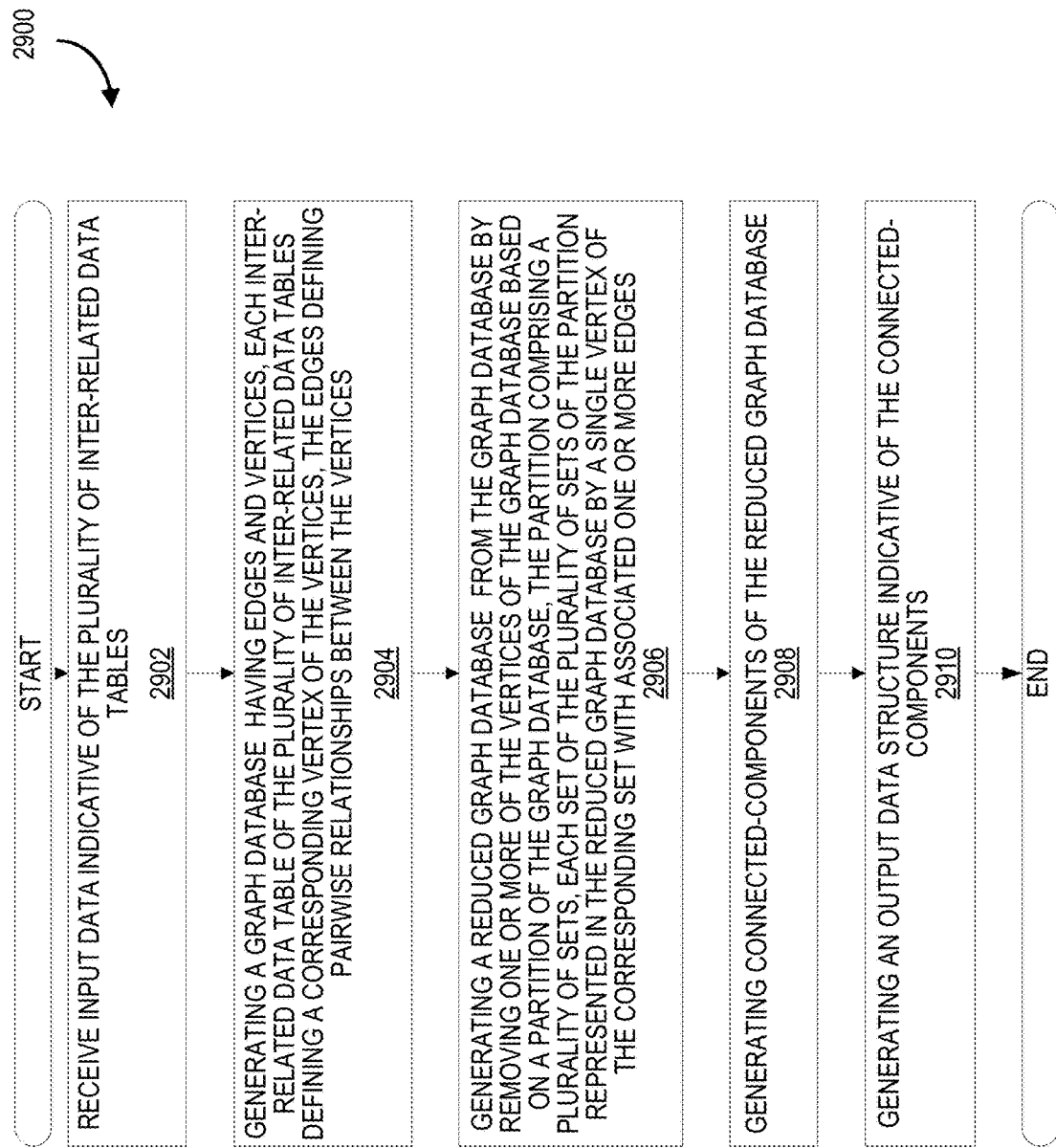
FIG. 29 is an exemplary method of generating a storage-efficient data structure representing a plurality of inter-related data tables and adapted for use in data processing, according to some embodiments. The steps are shown as examples and alternate, different examples are possible.

FIG. 29 is an exemplary method 2900 of generating a storage-efficient data structure representing a plurality of inter-related data tables and adapted for use in data processing. The steps are shown as examples and alternate, different examples are possible.

Step 2902 includes receiving input data indicative of the plurality of inter-related data tables.

Step 2904 includes generating a graph database having edges and vertices, each inter-related data table of the plurality of inter-related data tables defining a corresponding vertex of the vertices, the edges defining pairwise relationships between the vertices.

Step 2906 includes generating a reduced graph database from the graph database by removing one or more of the vertices of the graph database based on a partition of the graph database, the partition comprising a plurality of sets, each set of the plurality of sets of the partition represented in the reduced graph database by a single vertex of the corresponding set with associated one or more edges.

Step 2908 includes generating connected-components of the reduced graph database.

Step 2910 includes generating an output data structure indicative of the connected-components; wherein each of the pairwise relationships is defined by one or more common elements of a corresponding pair of data tables of the plurality of inter-related data tables, and the partition of the graph database is defined by an equivalence relation on the graph database.

The system 400 is adapted to implement the corresponding method generating a storage-efficient data structure representing a plurality of inter-related data tables and adapted for use in data processing as described in various embodiments, and the method, in some embodiments, is encapsulated in the form of a non-transitory computer readable media storing machine-interpretable instructions which when executed, cause a processor to perform the method stored thereon.

The system 400 can be, in some embodiments, a special purpose machine, such as a server or a rack mounted appliance that resides within or electrically coupled to a data center that includes a message bus upon which the special purpose machine receives data sets (e.g., from computer servers or data storage associated with different data sources).

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, and composition of matter, means, methods and steps described in the specification.

Processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A method of generating a storage-efficient data structure representing a plurality of inter-related data tables and adapted for use in data processing, the method comprising:
   receiving input data indicative of the plurality of inter-related data tables;
   generating a graph database having edges and vertices, each inter-related data table of the plurality of inter-related data tables defining a corresponding vertex of the vertices, the edges defining pairwise relationships between the vertices;
   determining a plurality of partitioned sets based on a partition of the graph database, each of the plurality of partitioned sets comprising a subset of the vertices from the graph database, and for each partitioned set from the plurality of partitioned sets:
   selecting the subset of the vertices from the graph database in the partitioned set based on an equivalence relation, such that a subset of the selected vertices in the partitioned set is an equivalence class as defined by the equivalence relation;
   generating a reduced graph database from the graph database based on the plurality of partitioned sets based on generating at least one graph homomorphism data structure object and/or quotient graph data structure object based on said equivalence relation, each vertex in the reduced graph database representing a respective partitioned set from the plurality of partitioned sets and associated with a corresponding subset of the vertices from the graph database;
   determining connected-components of the reduced graph database using one of a breadth-first and/or a depth-first search;
   searching subsets of the connected-components for sets of irreducible generators, each set of irreducible generators configured to generate a corresponding connected-component and having no proper subset capable of generating the corresponding connected-component;
   generating an output data structure indicative of the connected-components, wherein said output data is indicative of the sets of irreducible generators; and
   mining said irreducible generators to determine data lineages in said plurality of inter-related data tables;
   wherein each of the pairwise relationships is defined by one or more common elements of a corresponding pair of data tables of the plurality of inter-related data tables.

2. The method of claim 1, wherein the output data structure is adapted to be queried for entity-specific information for each of a plurality of separate entities, each data table of the plurality of inter-related data tables including entity-based information for the plurality of separate entities.

3. The method of claim 1, wherein each data table of the plurality of inter-related data tables includes textual data, and the output data structure is adapted to distinguish textual data based on Bag of Words and word ordering.

4. The method of claim 1, comprising:
   generating an additional output data structure indicative of the graph database.

5. The method of claim 4, wherein the additional output data structure is at least partially indicative of an adjacency matrix.

6. The method of claim 1, comprising:
   transmitting the output data structure to a terminal, via a network; and
   wherein receiving the input data indicative of the plurality of inter-related data tables includes receiving the input data from a plurality of network-based non-transitory storage devices having the plurality of inter-related data tables stored thereon.

7. The method of claim 1, comprising:
   generating k-core graph data structure objects by transforming the connected-components of the reduced graph database; and
   wherein generating the output data structure indicative of the connected-components includes:
   generating output data indicative of the k-core graph data structure objects.

8. The method of claim 1, wherein the reduced graph database is a quotient graph of the graph database.

9. A system for generating a storage-efficient data structure representing a plurality of inter-related data tables and adapted for use in data processing, the system comprising:
    one or more processors operating in conjunction with computer memory, the one or more processors configured to:
        receive input data indicative of the plurality of inter-related data tables;
        generate a graph database having edges and vertices, each inter-related data table of the plurality of inter-related data tables defining a corresponding vertex of the vertices, the edges defining pairwise relationships between the vertices;
        determine a plurality of partitioned sets based on a partition of the graph database, each of the plurality of partitioned sets comprising a subset of the vertices from the graph database, and for each partitioned set from the plurality of partitioned sets:
        select the subset of the vertices from the graph database in the partitioned set based on an equivalence relation, such that a subset of selected vertices in the partitioned set is an equivalence class as defined by the equivalence relation;
        generate a reduced graph database from the graph database based on the plurality of partitioned sets based on generating at least one graph homomorphism data structure object and/or quotient graph data structure object based on said equivalence relation, each vertex in the reduced graph database representing a respective partitioned set from the plurality of partitioned sets and associated with a corresponding subset of the vertices from the graph database;
        determine connected-components of the reduced graph database using one of a breadth-first and/or a depth-first search;
        searching subsets of the connected-components for sets of irreducible generators, each set of irreducible generators configured to generate a corresponding connected-component and having no proper subset capable of generating the corresponding connected-component;
        generate an output data structure indicative of the connected-components, wherein said output data is indicative of the sets of irreducible generators; and
        mine said irreducible generators to determine data lineages in said plurality of inter-related data tables;
    wherein each of the pairwise relationships is defined by one or more common elements of a corresponding pair of data tables of the plurality of inter-related data tables.

10. The system of claim 9, wherein the output data structure is adapted to be queried for entity-specific information for each entity of a plurality of separate entities, each data table of the plurality of inter-related data tables including entity-based information for the plurality of separate entities.

11. The system of claim 9, wherein each data table of the plurality of inter-related data tables includes textual data, and the output data structure is adapted to distinguish textual data based on Bag of Words and word ordering.

12. The system of claim 9, wherein the one or more processors is further configured to:
    generate an additional output data structure indicative of the graph database.

13. The system of claim 12, wherein the additional output data structure is at least partially indicative of an adjacency matrix.

14. The system of claim 9, wherein the one or more processors is further configured to:
    receive the input data from a plurality of network-based non-transitory storage devices having the plurality of inter-related data tables stored thereon; and
    transmit the output data structure to a terminal, via a network.

15. The system of claim 9, wherein the one or more processors is further configured to:
    generate k-core graph data structure objects by transforming the connected-components of the reduced graph database; and
    generate output data indicative of the k-core graph data structure objects.

16. The system of claim 9, wherein the reduced graph database is a quotient graph of the graph database.

17. A non-transitory computer readable medium storing machine interpretable instruction sets, which when executed by a processor, cause the processor to perform a method of generating a storage-efficient data structure representing a plurality of inter-related data tables and adapted for use in data processing, the method comprising:
    receiving input data indicative of the plurality of inter-related data tables;
    generating a graph database having edges and vertices, each inter-related data table of the plurality of inter-related data tables defining a corresponding vertex of the vertices, the edges defining pairwise relationships between the vertices;
    determining a plurality of partitioned sets based on a partition of the graph database, each of the plurality of partitioned sets comprising a subset of the vertices from the graph database, and for each partitioned set from the plurality of partitioned sets:
    selecting the subset of the vertices from the graph database in the partitioned set based on an equivalence relation, such that a subset of the selected vertices in the partitioned set is an equivalence class as defined by the equivalence relation;
    generating a reduced graph database from the graph the plurality of partitioned sets based on generating at least one graph homomorphism data structure object and/or quotient graph data structure object based on said equivalence relation, each vertex in the reduced graph database representing a respective partitioned set from the plurality of partitioned sets and associated with a corresponding subset of the vertices from the graph database;
    determining connected-components of the reduced graph database using one of a breadth-first and/or a depth-first search;
    searching subsets of the connected-components for sets of irreducible generators, each set of irreducible generators configured to generate a corresponding connected-component and having no proper subset capable of generating the corresponding connected-component;
    generating an output data structure indicative of the connected-components, wherein said output data is indicative of the sets of irreducible generators; and
    mining said irreducible generators to determine data lineages in said plurality of inter-related data tables;

wherein each of the pairwise relationships is defined by one or more common elements of a corresponding pair of data tables of the plurality of inter-related data tables.

\* \* \* \* \*